(12) United States Patent
Choi et al.

(10) Patent No.: US 10,409,476 B2
(45) Date of Patent: Sep. 10, 2019

(54) MOBILE TERMINAL AND METHOD FOR CONTROLLING THE SAME

(71) Applicant: LG ELECTRONICS INC., Seoul (KR)

(72) Inventors: Yoojin Choi, Seoul (KR); Eunkyung Choi, Seoul (KR); Wook Shin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 231 days.

(21) Appl. No.: 15/376,990

(22) Filed: Dec. 13, 2016

(65) Prior Publication Data

US 2018/0046346 A1 Feb. 15, 2018

(30) Foreign Application Priority Data

Aug. 12, 2016 (KR) ........................ 10-2016-0103172

(51) Int. Cl.
| | | |
|---|---|---|
| G06F 3/0488 | (2013.01) | |
| G06F 3/041 | (2006.01) | |
| G06F 3/0482 | (2013.01) | |
| G06F 3/0484 | (2013.01) | |
| G06F 3/0481 | (2013.01) | |

(52) U.S. Cl.
CPC .......... *G06F 3/0488* (2013.01); *G06F 3/0414* (2013.01); *G06F 3/0482* (2013.01); *G06F 3/04845* (2013.01); *G06F 3/04817* (2013.01)

(58) Field of Classification Search
CPC .. G06F 3/0414; G06F 3/04817; G06F 3/0482; G06F 3/04845; G06F 3/0488
See application file for complete search history.

(56) References Cited

U.S. PATENT DOCUMENTS

| | | | | |
|---|---|---|---|---|
| 2013/0201131 A1* | 8/2013 | Choi | ...................... | G06F 3/0488 345/173 |
| 2014/0035942 A1* | 2/2014 | Yun | ........................ | G09G 5/006 345/592 |
| 2014/0375596 A1* | 12/2014 | Kim | ...................... | G06F 3/0416 345/174 |
| 2015/0365306 A1* | 12/2015 | Chaudhri | .............. | G06F 3/0416 715/736 |

(Continued)

FOREIGN PATENT DOCUMENTS

CN 105843499 A * 8/2016

*Primary Examiner* — Chau T Nguyen
(74) *Attorney, Agent, or Firm* — Birch, Stewart, Kolasch & Birch, LLP

(57) ABSTRACT

A mobile terminal including a wireless communication processor configured to provide wireless communication; a display; and a controller configured to display a third task screen corresponding to an application on the display, wherein at least a second task screen and a first task screen are previously displayed on the display, in response to a touch input applied to a back key on the mobile terminal that is equal to or lower than a reference pressure while the third task screen is displayed, display the second task screen on the display, and in response to the touch input applied to the back key on the mobile terminal that exceeds the reference pressure while the third task screen is displayed, jump from the third task screen to the previously displayed first task screen such that the first task screen is displayed on the display.

15 Claims, 19 Drawing Sheets

(56) References Cited

U.S. PATENT DOCUMENTS

2016/0055769 A1\* 2/2016 Angelescu ........... G09B 29/106
                                                    345/173
2017/0068374 A1\* 3/2017 Jansky ................. G06F 3/0416
2017/0351398 A1\* 12/2017 Oikawa ................ G06F 3/0482

\* cited by examiner

MOBILE TERMINAL AND METHOD FOR CONTROLLING THE SAME

CROSS-REFERENCE TO RELATED APPLICATION

Pursuant to 35 U.S.C. § 119(a), this application claims the benefit of an earlier filing date of and the right of priority to Korean Application No. 10-2016-0103172, filed on Aug. 12, 2016, the contents of which are incorporated by reference herein in their entirety.

BACKGROUND OF THE INVENTION

1. Field of the Invention

This specification relates to a mobile terminal having a touch screen, and a method for controlling the same.

2. Background of the Invention

Terminals may be divided into mobile/portable terminals and stationary terminals. Also, the mobile terminals may be classified into handheld terminals and vehicle mounted terminals.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. Specifically, in recent time, mobile terminals can receive broadcast and multicast signals to allow viewing of video or television programs.

As it becomes multifunctional, a mobile terminal can capture still images or moving images, play music or video files, play games, receive broadcast and the like, so as to be implemented as an integrated multimedia player. Also, the mobile terminal may enter a plurality of execution steps by opening a specific application installed thereon, and accordingly execute an associated task by accessing a specific execution step.

In this instance, in order for a user to go back to a previous step or several steps before a current execution step, the user should inconveniently apply several inputs to a back key by a number of screen jumping, or execute plural manipulations until entering a desired execution step after terminating a corresponding application. In addition, some tasks, such as changing setting information at a current execution step and the like are restricted from going back to a previous step using the back key.

SUMMARY OF THE INVENTION

Therefore, an aspect of the detailed description is to provide a mobile terminal capable of going directly to a specific step or recovering a setting, irrespective of a current execution step of a currently-used application, without plural manipulation of a back key, and a method for controlling the same.

To achieve these and other advantages and in accordance with the purpose of this specification, as embodied and broadly described herein, there is provided a mobile terminal including a wireless communication processor configured to provide wireless communication; a display; and a controller configured to: display a third task screen corresponding to an application on the display, wherein at least a second task screen and a first task screen are previously displayed on the display, in response to a touch input applied to a back key on the mobile terminal that is equal to or lower than a reference pressure while the third task screen is displayed, display the second task screen on the display, and in response to the touch input applied to the back key on the mobile terminal that exceeds the reference pressure while the third task screen is displayed, jump from the third task screen to the previously displayed first task screen such that the first task screen is displayed on the display.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another.

A singular representation may include a plural representation unless it represents a definitely different, meaning from the context. Terms such as "include" or "has" are used herein and should be understood that they are intended to indicate an existence of features, numbers, steps, functions, several components, or combinations thereof, disclosed in the specification, and it is also understood that greater or fewer features, numbers, steps, functions, several components, or combinations thereof may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, digital signage, and the like.

Figure 1A:
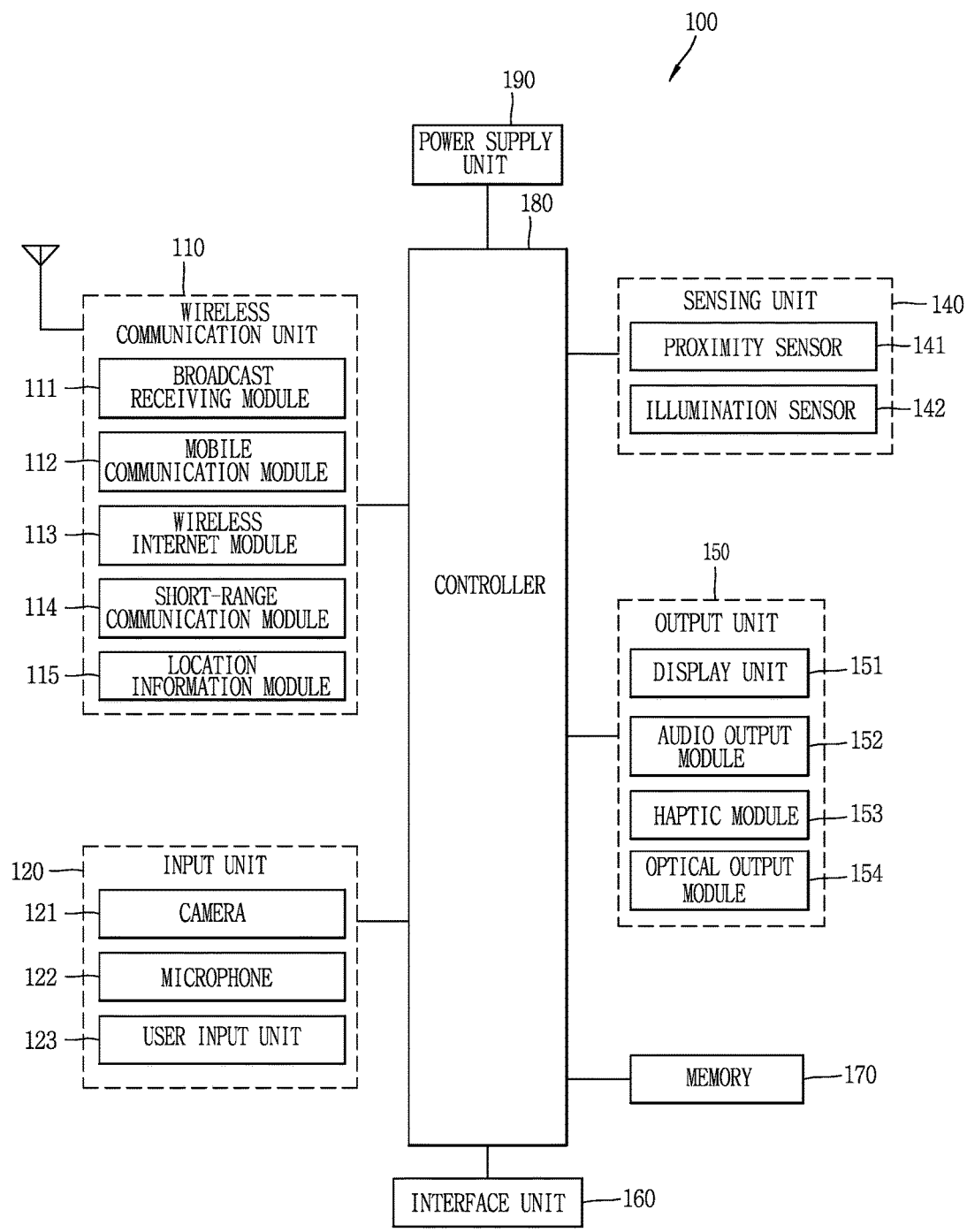
FIG. 1A is a block diagram illustrating a mobile terminal according to an embodiment of the present invention.
Figure 1B:
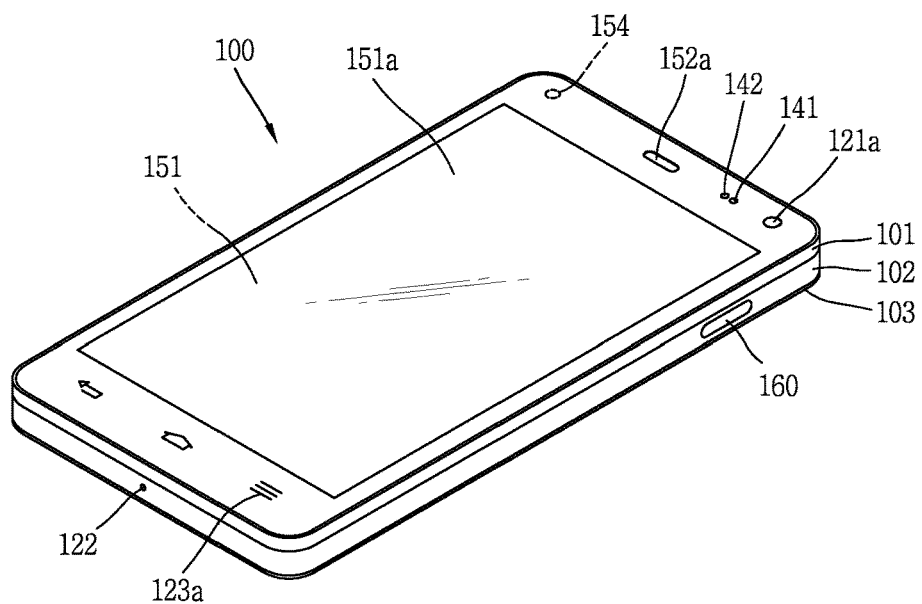
FIGS. 1B and 1C are conceptual views illustrating one example of a mobile terminal, viewed from different directions.
Figure 1C:
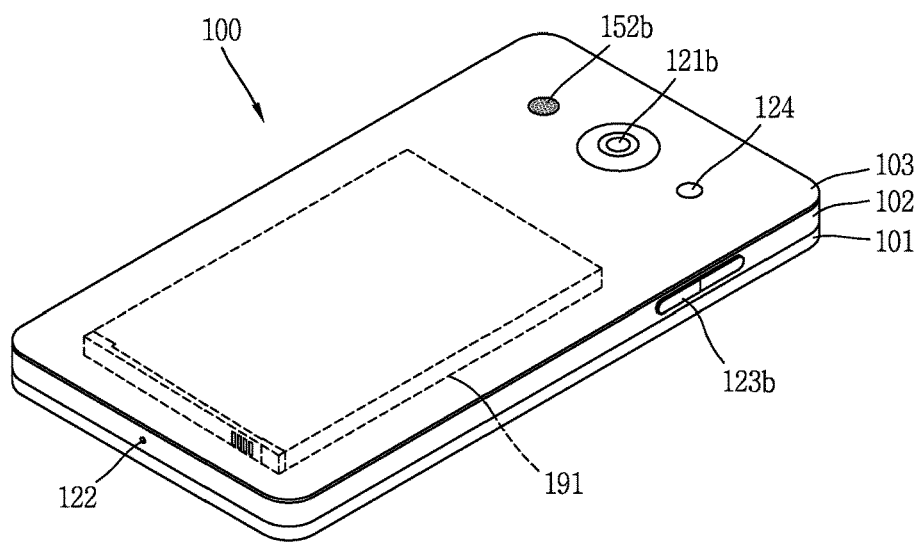

Reference is now made to FIGS. 1A to 1C, where FIG. 1A is a block diagram of a mobile terminal in accordance with the present disclosure, and FIGS. 1B and 1C are conceptual views of one example of the mobile terminal, viewed from different directions. The mobile terminal 100 is shown having components such as a wireless communication unit 110, an input unit 120, a sensing unit 140, an output unit 150, an interface unit 160, a memory 170, a controller 180, and a power supply unit 190. Implementing all of the illustrated components is not a requirement, and that greater or fewer components may alternatively be implemented.

In more detail, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

The wireless communication unit 110 includes one or more of a broadcast receiving module 111, a mobile communication module 112, a wireless Internet module 113, a short-range communication module 114, and a location information module 115. The input unit 120 includes a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) is obtained by the input unit 120 and may be analyzed and processed according to user commands.

The sensing unit 140 is typically implemented using one or more sensors configured to sense internal information of the mobile terminal, the surrounding environment of the mobile terminal, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal disclosed herein may be configured to utilize information obtained from one or more sensors of the sensing unit 140, and combinations thereof.

The output unit 150 is typically configured to output various types of information, such as audio, video, tactile output, and the like. The output unit 150 is shown having at least one of a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 can perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or functions appropriate for a user by processing signals, data, information and the like, which are input or output by the aforementioned various components, or activating application programs stored in the memory 170.

Also, the controller 180 controls some or all of the components illustrated in FIG. 1A according to the execution of an application program that have been stored in the memory 170. In addition, the controller 180 can control at least two of those components included in the mobile terminal to activate the application program.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least part of the components may cooperatively operate to implement an operation, a control or a control method of a mobile terminal according to various embodiments disclosed herein. Also, the operation, the control or the control method of the mobile terminal may be implemented on the mobile terminal by an activation of at least one application program stored in the memory 170.

Hereinafter, description will be given in more detail of the aforementioned components with reference to FIG. 1A, prior to describing various embodiments implemented through the mobile terminal 100. First, regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), Enhanced Voice-Date Optimized or Enhanced Voice-Data Only (EV-DO), Wideband CDMA (WCDMA), High Speed Downlink Packet access (HSDPA), High Speed Uplink Packet Access (HSUPA), Long Term Evolution (LTE), LTE-advanced (LTE-A) and the like). Examples of the wireless signals include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LET-A, and the like, as part of a mobile communication network, the wireless Internet module 113 may be understood as a type of the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In addition, another mobile terminal (which may be configured similarly to mobile terminal 100) may be a wearable device, for example, a smart watch, a smart glass or a head mounted display (HMD), which can exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

The location information module 115 is generally configured to detect, calculate, derive or otherwise identify a position (or current position) of the mobile terminal. As an example, the location information module 115 includes a Global Position System (GPS) module, a Wi-Fi module, or both. For example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the mobile terminal. The location information module 115 is a module used for acquiring the position (or the current position) and may not be limited to a module for directly calculating or acquiring the position of the mobile terminal.

The input unit 120 may be configured to permit various types of inputs to the mobile terminal 100. Examples of such inputs include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. Meanwhile, the cameras 121 may be arranged in a matrix configuration to permit a plurality of images having various angles or focal points to be input to the mobile terminal 100. Also, the cameras 121 may be located in a stereoscopic arrangement to acquire left and right images for implementing a stereoscopic image.

The microphone 122 processes an external audio signal into electric audio (sound) data. The processed audio data can be processed in various manners according to a function being executed in the mobile terminal 100. If desired, the microphone 122 may include assorted noise removing algorithms to remove unwanted noise generated in the course of receiving the external audio signal.

The user input unit 123 is a component that permits input by a user. Such user input may enable the controller 180 to control operation of the mobile terminal 100. The user input unit 123 may include one or more of a mechanical input element (for example, a mechanical key, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like, and generate a corresponding sensing signal. The controller 180 generally cooperates with the sending unit 140 to control operation of the mobile terminal 100 or execute data processing, a function or an operation associated with an application program installed in the mobile terminal based on the sensing signal. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data (or information) according to whether a touch with respect to a point on the touch screen is either a proximity touch or a contact touch.

A touch sensor can sense a touch (or a touch input) applied to the touch screen, such as display unit 151, using any of a variety of touch methods. Examples of such touch methods include a resistive type, a capacitive type, an infrared type, and a magnetic field type, among others. As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched region, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 can sense which region of the display unit 151 has been touched. In addition, the touch controller may be a component separate from the controller 180, the controller 180, and combinations thereof.

Meanwhile, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor. Implementing the camera 121 with a laser sensor allows detection of a touch of a physical object with respect to a 3D stereoscopic image. The photo sensor may be laminated on; or overlapped with, the mobile terminal. The photo sensor may be configured to scan movement of the physical object in proximity to the touch screen. In more detail, the photo sensor may include photo diodes and transistors (TR) at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the flexible display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 can include message reception, call signal reception, a missed call, an alarm, a schedule alarm, an email reception, information reception through an application, and the like.

A signal output by the optical output module 154 may be implemented so the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 can also be operated in relation to a network storage device that performs the storage function of the memory 170 over a network, such as the Internet.

The controller 180 can typically control an operation associated with an application program and the general operations of the mobile terminal 100. For example, the controller 180 can set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected. As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance. Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type the body of the portable electronic device. However, the mobile terminal 100 can alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of portable electronic device. However, such teachings with regard to a particular type of portable electronic device will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like. As an alternative to the example in which the plurality of cases form an inner space for accommodating components, the mobile terminal 100 can be configured such that one case forms the inner space. In this example, a mobile terminal 100 having a uni-body is formed so synthetic resin or metal extends from a side surface to a rear surface.

If desired, the mobile terminal 100 can include a waterproofing unit for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 can include a display unit 151, first and second audio output module 152a and 152b, a proximity sensor 141, an illumination sensor 142, an optical output module 154, first and second cameras 121a and 121b, first and second manipulation units 123a and 123b, a microphone 122, an interface unit 160, and the like.

Hereinafter, as illustrated in FIGS. 1B and 1C, description will be given of the exemplary mobile terminal 100 in which the front surface of the terminal body is shown having the display unit 151, the first audio output module 152a, the proximity sensor 141, the illumination sensor 142, the optical output module 154, the first camera 121a, and the first manipulation unit 123a, the side surface of the terminal body is shown having the second manipulation unit 123b, the microphone 122, and the interface unit 160, and the rear surface of the terminal body is shown having the second audio output module 152b and the second camera 121b.

However, those components may not be limited to the arrangement. Some components may be omitted or rearranged or located on different surfaces. For example, the first manipulation unit 123a may be located on another surface of the terminal body, and the second audio output module 152b may be located on the side surface of the terminal body other than the rear surface of the terminal body.

The display unit 151 outputs information processed in the mobile terminal 100. For example, the display unit 151 may display execution screen information of an application program executing at the mobile terminal 100 or user interface (UI) and graphic user interface (GUI) information in response to the execution screen information.

The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. In addition, the touch screen may serve as the user input unit 123 (see FIG. 1A). Therefore, the touch screen may replace at least some of the functions of the first manipulation unit 123a.

The first audio output module 152a may be implemented in the form of a receiver for transferring call sounds to a user's ear and the second audio output module 152b may be implemented in the form of a loud speaker to output alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this instance, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule alarm, an email reception, information reception through an application, and the like. When a user has checked a generated event, the controller 180 can control the optical output module 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof. Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

When the rear input unit is provided at the rear surface of the terminal body, a new type of user interface using this may be implemented. Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 can include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

A flash 124 is shown adjacent to the second camera 121b. When an image of a subject is captured with the camera 121b, the flash 124 may illuminate the subject. The second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 can include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 can be provided. The cover or pouch may cooperate with the display unit 151 to extend the function of the mobile terminal 10Q. Another example of the accessory is a touch pen for assisting or extending a touch input to a touch screen.

Hereinafter, description will be given of embodiments related to a control method which can be implemented in the mobile terminal having such configuration, with reference to the accompanying drawings. It will be obvious to those skilled in the art that the present invention can be specified into other specific forms without departing from the scope and essential features of the present invention.

Further, the display unit 151 (or a touch sensor provided on the display unit 151) disclosed herein can sense (detect) a touch degree, namely, a pressure strength of a touch input applied to the display unit 151 and generate a touch signal corresponding to the detected touch degree. Thus, the display unit 151 (or the touch sensor provided on the display unit 151) may include a plurality of piezoelectric elements. The generated touch signal includes information related to the pressure strength (or piezoelectric strength) of the touch input and is transferred to the controller 180 such that the controller 180 executes an operation corresponding to the generated touch signal.

Figure 2:
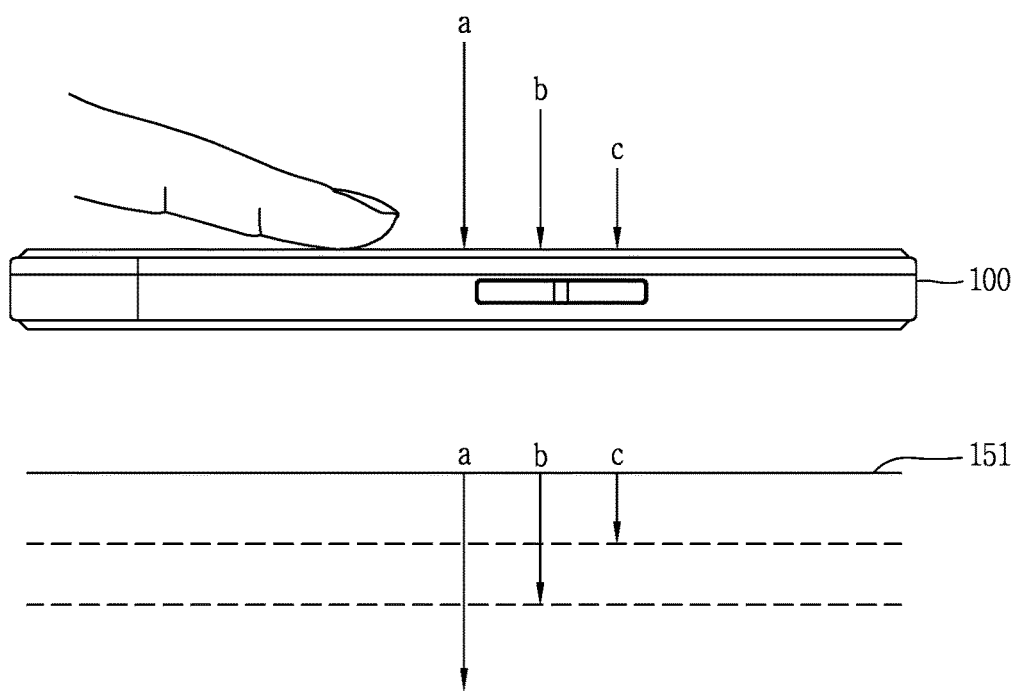
FIG. 2 is a representative conceptual view illustrating a touch degree of a touch input applied to a display unit of a mobile terminal in accordance with the present invention.

Next, FIG. 2 is a representative conceptual view illustrating a touch degree of a touch input applied to a display unit of a mobile terminal in accordance with the present invention. As illustrated in FIG. 2, a touch input corresponding to a user's touch action, applied to the display unit 151 of the mobile terminal 100, can be sensed or detected in various manners (a, b, c). The controller 180 can execute an operation that matches the touch pressure of the sensed touch input. Thus, the controller 180 can detect a voltage corresponding to the touch pressure and generate a different touch signal according to the detected voltage.

For example, when the user presses the display unit 151 with strength 'c,' a voltage with a minimum touch voltage level (e.g., less than 0.04 v) may be detected and a first touch signal may be generated accordingly. Also, when the user presses the display unit 151 more strongly with strength 'b,' a voltage in the range of 0.04 v to 1.5 v may be detected and a second touch signal may be generated accordingly. Also, when the user presses the display unit 151 much more strongly with strength 'a,' a voltage with a maximum voltage level or in the range of 1.5 v to 3.0 v may be detected and a third touch signal may be generated accordingly. In addition, the first, second and third touch signals may be input values for executing different control commands. That is, the pressure strength of each touch action can be converted into a voltage value and used as a different input value.

In addition, the first touch signal generating the voltage with the minimum touch voltage level may be referred to as having touch pressure less than a reference pressure. Also, the second touch signal and the third touch signal generating voltages exceeding the minimum touch voltage level may be referred to as having touch pressure exceeding the reference pressure.

Also, when the strength of the touch pressure varies without releasing a touch input that is applied to the display unit 151 and exceeds the minimum voltage level, for example, when the touch pressure is reduced lower than initially-applied pressure, a plurality of touch signals, such as the third touch signal and the second touch signal, can be generated in the order corresponding to the touch pressure. In this instance, first information corresponding to the third touch signal and second information corresponding to the second touch signal can eventually be output on the display unit 151 in a sequential manner.

Also, the voltage level and the voltage value are merely illustrative and may be set variously. The foregoing description has been given of three divided pressure strengths with respect to a touch operation, but the present invention may not be limited to this. Alternatively, greater or fewer levels of pressure strength may be set. In addition, two operations executed based on a degree of exceeding a reference voltage will be described hereinafter but greater or fewer operations may be implemented.

The user input unit 123 of the mobile terminal 100 according to the embodiment that includes at least one of the aforementioned components includes a menu key for sensing a touch input and executing cancellation of a command input. In addition, the user input unit 123 including the menu key may be implemented as a soft key on the display unit 151 provided on the front surface of the mobile terminal 100 or implemented as a touch key or a hard key on one area, for example, one of front, rear and side surfaces of the mobile terminal 100 extending from the display unit 151. For the former, the menu key or the user input unit 123 may be included in the display unit 151.

When a first task screen is output on the display unit 151 of the mobile terminal 100 according to this embodiment, and when a touch degree of a touch input applied to the menu key exceeds the reference pressure, the controller 180 of the mobile terminal 100 can execute a second function which is different from a basic function of the menu key.

In addition, the reference pressure refers to the touch strength corresponding to a degree that a voltage (e.g., about 0.04 v) of the minimum touch voltage level is detected. Therefore, the touch input applied by the touch degree exceeding the reference pressure refers to a touch operation applied with touch strength corresponding to a degree that the voltage (e.g., about 0.04 v) of the minimum touch voltage level is detected. For example, when a touch within a range of reference pressure is applied to the menu key, a control command for executing the basic function of the menu key is generated.

Also, the touch input with the touch degree exceeding the reference pressure refers to a touch operation applied with much stronger touch strength corresponding to a degree that a voltage exceeding the voltage (e.g., about 0.04 v) of the minimum touch voltage level is detected. In the above example, when a touch exceeding the reference pressure is applied to the menu key, a second control command for executing an operation different from the basic function of the menu key is generated.

In more detail, in response to a touch input exceeding reference pressure being applied to the menu key, the controller 180 can restrict an implementation (output) of a second task screen which has been output before the first task screen, and output a third task screen different from the first and second task screens.

In addition, the second task screen is a screen that is output when a touch within the reference pressure range is applied to the menu key, namely, a 'previous screen of the first task screen.' That is, when a touch input exceeding the reference pressure is applied to the menu key, an output of the previous screen of the first task screen is restricted.

The third task screen may correspond to one of previous tasks which have been executed before the second task screen is output. That is, when a touch within the reference pressure range is applied to the back key, a second task screen which has been output just before is displayed. Further, when a touch exceeding the reference pressure is applied to the back key, a previous screen of the first task screen is skipped and one of task screens which have been displayed before the previous screen of the first task screen is displayed.

Accordingly, for example, the user does not have to touch the back key for going back to a screen three steps before (three-step previous screen of) a current screen. Also, the three-step previous screen is directly output while skipping (without sequentially outputting) linked one-step and two-step previous screens. This results in a reduction of resource waste and a time taken for reaching a screen corresponding to a desired step.

Alternatively, the third task screen may correspond to when at least one input value set for the first task screen has been recovered. That is, a setting-changed state is not recovered even though a touch within a reference pressure range is applied to the back key. However, when a touch exceeding the reference pressure is applied to the back key, a setting value is recovered directly to an input value just before being changed without having to change the input value by entering a setting step. Accordingly, even after at least one setting is changed by a user manipulation, the changed setting can be recovered directly by a single touch input.

Figure 3:
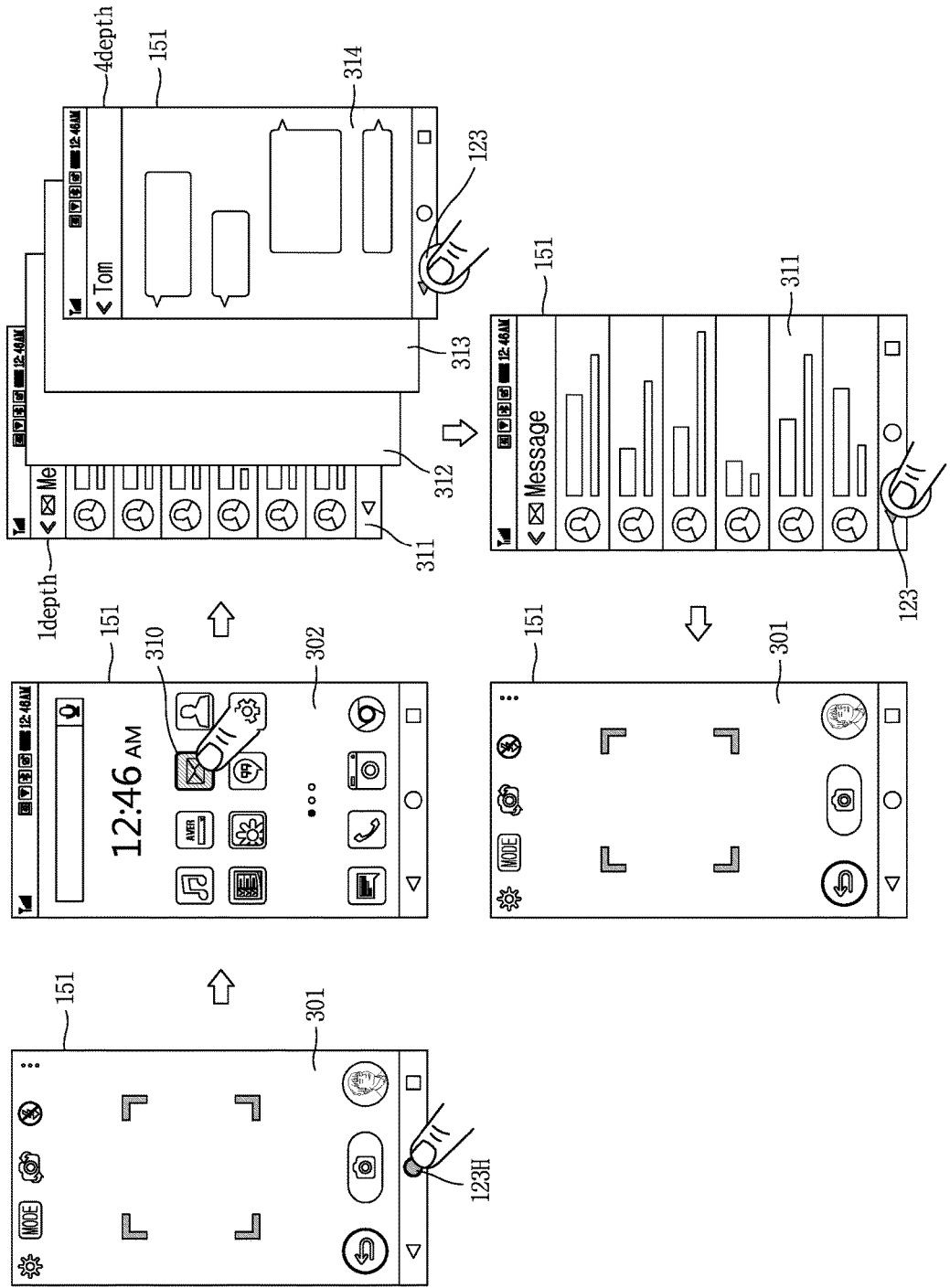
FIG. 3 is a conceptual view illustrating representative operations of a mobile terminal in accordance with the present invention.

Next, FIG. 3 is a conceptual view illustrating representative operations of a mobile terminal according to an embodiment of the present invention. First, a preview screen 301 corresponding to an execution of a camera application is output on the display unit 151 of the mobile terminal 100 according to the embodiment of the present invention. Afterwards, when a touch is applied to an icon 310 of a first application (e.g., a message application) on a home screen 302 which has been output in response to a touch input applied to a home button 123H, an initial execution screen 311 of the first application is output on the display unit 151.

Afterwards, according to a user manipulation, a lower page 312 of a second level can be entered from a first page 311 of a first level, a lower page 313 of a third level can be entered from the lower page 312 of the second level, and a lower page 314 of a fourth level can similarly be opened. In this instance, a lower page of each level refers to a lower/upper page of a previously-output page, and it can be understood that the depth increases as the level increases from the first level to the fourth level. For example, the lower page 314 of the fourth level may be referred to as having a depth '4.'

When the lower page 314 of the fourth level is output as the first task screen on the message application, and when a touch exceeding the reference pressure is detected on a back key 123 for cancelling a command input among keys output on a lower end of the display unit 151, the lower page 314 of the fourth level jumps back to the initial execution screen 311 of the first level. That is, the initial execution screen of the currently-used message application is immediately opened by skipping the lower pages of the third and second levels. That is, the first page 311 of the message application is output as the third task screen on the display unit 151.

Thus, when task screen jumping within the message application, the current page can be linked with a starting point, namely, an initial (first) page of the currently-used message application, as well as a previously page which was output just before the current page.

Also, in the output state of the first page 311 of the message application, and when a touch input exceeding the reference pressure is additionally applied to the back key 123, the currently-used message application can jump (move, shift, go) back to the last execution step of a previously-used application. That is, the first (initial) page 311 of the message application jumps to the preview screen 301 of the camera application.

Thus, when a touch input exceeding the reference pressure is applied to a menu key for cancelling a command input, an execution screen of a first application corresponding to the first task screen can jump to (go to, be switched into) an execution screen of a second application which is different from the first application and corresponds to a third task screen. In addition, the second application may be one of applications which have been used before the first application.

In this instance, the jumped execution screen of the second application may correspond to the last execution step of a previously-used application, other than an initial execution screen of the second application. For example, referring to FIG. 3, while a camera application is executed, a lower page with a fourth depth of a message application is output after first to third depth-lower pages are sequentially output. In this state, when the touch operation is executed after outputting an initial (first) page 311 with a first depth of the message application according to a user manipulation, the first page 311 of the message application can jump back to the camera application.

According to the related art method, when a touch is applied to the back key while the first page 311 of the message application is output, there is no step to go back in the corresponding application. Therefore, an operation of terminating the application (e.g., going back to a home screen or popping up a message 'Do you want to close the program?') has been executed. However, the present invention allows for jumping to a previously-used other application while restricting the realization (output) of the second task screen, namely, terminating the corresponding application.

Therefore, even after the first task screen of the first application jumps to the third task screen of the second application, for example, even after the first page 311 of the message application of FIG. 3 jumps to the preview screen 301 of the previously-used camera application in response to a touch input applied to the back key, the message application is continuously executed.

Also, the manipulation of several keys for opening a previously-used other application again is not required. For example, a desired step can be opened only by touching the back key, without having to touch the back key several times for going back to the first page of the message application and then touching a home key and a specific icon or touching a recent key and a specific page for using the camera application.

Also, for jumping back (going back, switching, moving) to a previously-used application from a currently-used application, an output of a home screen may be restricted. In more detail, in FIG. 3, the icon 310 of the message application is selected by moving to (opening) the home screen 302 for using the message application while using the camera application. However, according to an embodiment of the present invention, the first page of a currently-used application is directly linked with a screen of the last execution step of the application that has been used just before.

According to this embodiment, without having to manipulate the back key several times or finding and manipulating different types of keys for going back several steps before a current task screen, a single manipulation with respect to one key can allow for fast jumping back (moving) to the first page of a currently-used application or the last execution page of a previously-used different application.

Figure 4:
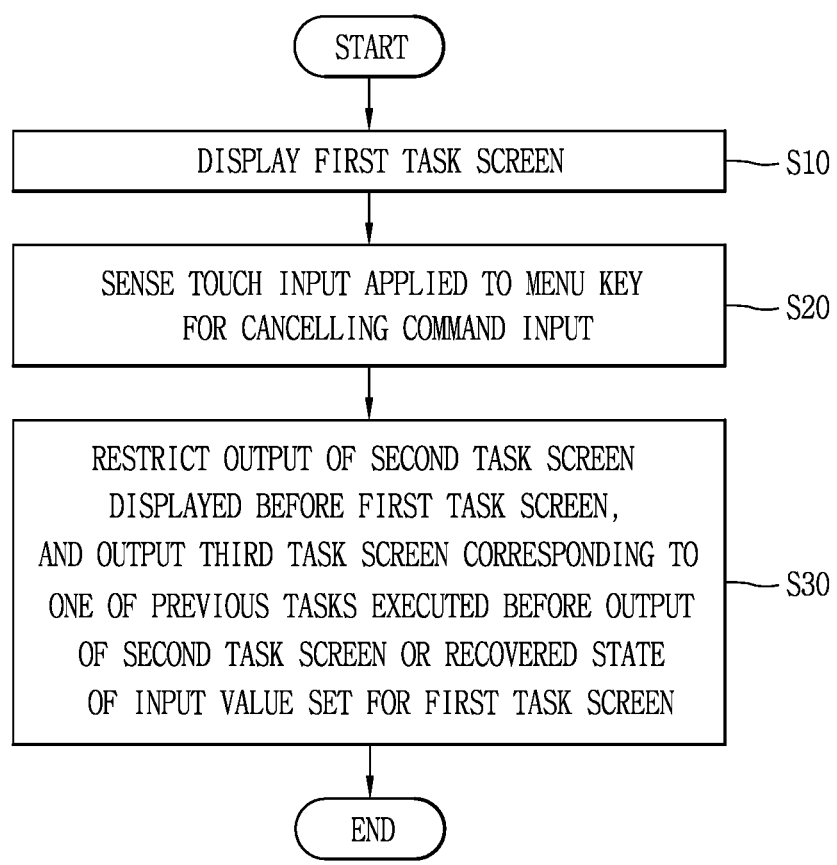
FIG. 4 is a flowchart illustrating a method for controlling a mobile terminal in accordance with the present invention.

Next, FIG. 4 is a flowchart illustrating a method for controlling a mobile terminal according to an embodiment of the present invention. First, a first task screen is output on the display unit 151 of the mobile terminal 100 according to this embodiment (S10). In addition, there is no limit on a type of an application corresponding to the first task screen and an execution step in the corresponding application. For example, the first task screen may be any execution step of a specific application installed on the mobile terminal, or may be a home screen or a plurality of screens including execution screens of a plurality of applications.

Thus, in the output state of the first task screen, the mobile terminal 100 senses a touch input applied to a menu key, for example, a back key for cancelling a command input (S20). In this instance, when the touch input applied to the back key exceeds a reference pressure, the mobile terminal 100 can restrict an output of a second task screen which was output before the first task screen, and simultaneously output a third task screen different from the first and second task screens (S30).

In addition, the second task screen is a previous execution step of the first task screen, a screen for closing the first application corresponding to the first task screen (e.g., a screen for checking whether or not to close the corresponding program), or a home screen. When the first task screen is the home screen, the second task screen may not be existent or omitted. A detailed embodiment illustrating when the first task screen is the home screen will be given in more detail later.

Also, the third task screen corresponds to one of previous tasks which have been executed before the second task screen is output. In more detail, the third task screen may be an initial screen of the first application corresponding to the first task screen, or the most recent task screen of a second application which was used before the first application.

Alternatively, the third task screen may correspond to a state that at least one of input values set for the first task screen has been recovered. In more detail, the third task screen may be a screen that an input value set on the first task screen has been initialized, or a screen that tasks of applications included in the first task screen have all been initialized.

As such, the present invention allows for jumping directly to an initial step of a currently-used application from a specific step of the application or fast jumping to a previously-used another application from a currently-used application by skipping a home screen, by virtue of a touch input applied to the back key.

Hereinafter, description will be given in detail of various embodiments related to fast accessing previously-executed tasks or fast recovering preset input values based on a touch degree of a touch input applied to a back key, with reference to FIGS. 5A to 12B.

Figure 5A:
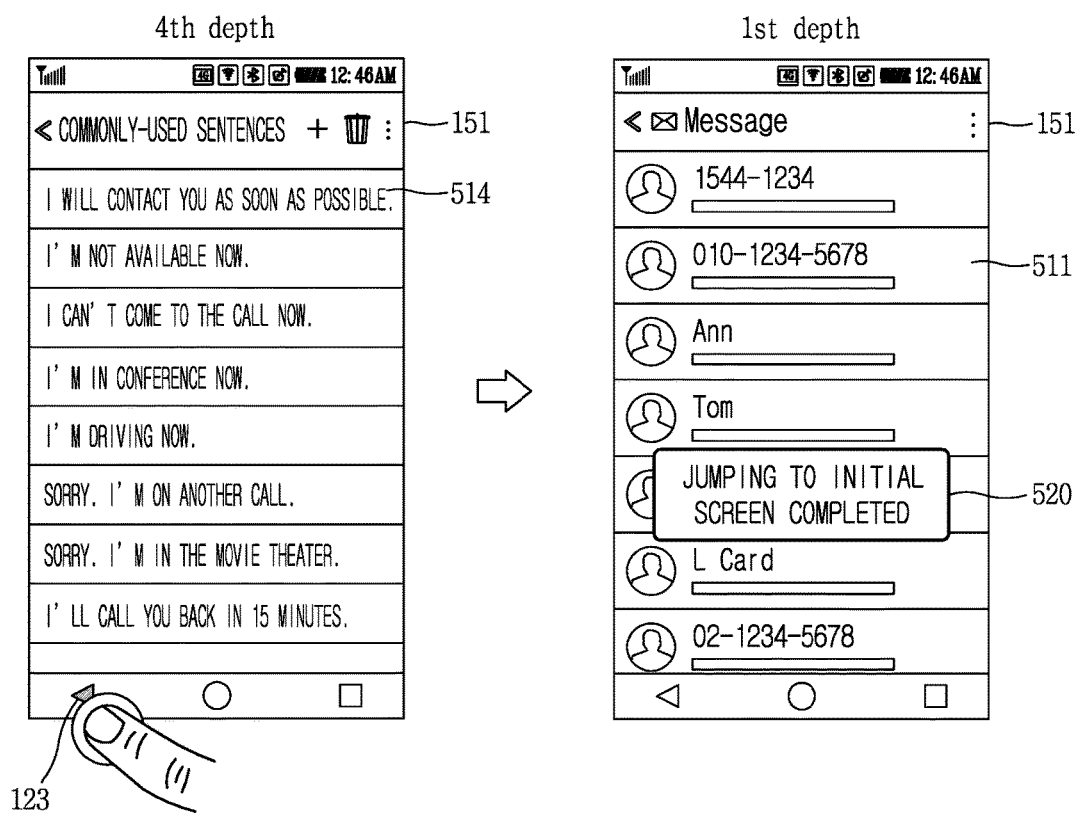
FIGS. 5A, 5B, 5C, 5D, 5E, 6, 7, 8A, 8B, 8C, 9, 10, 11, 12A and 12B are conceptual views illustrating various embodiments associated with fast accessing previously-executed tasks or fast recovering a preset input value based on a touch degree of a touch input applied to a menu key for cancelling a command input, in a mobile terminal in accordance with the present invention.

As one embodiment of the present invention, FIG. 5A illustrates an example of going (jumping, moving) directly to an initial execution screen 511 of the application from a fourth-depth execution screen 514 of a message application. When the fourth-depth execution screen 514 of the message application is output, for example, when a touch input exceeding a reference pressure is applied to the back key 123 output on the lower end of the display unit 151, the controller 180 of the mobile terminal 100 outputs an initial execution screen of the message application on the full display unit 151 at a released time point of the touch input.

In this instance, while the touch input applied to the back key is maintained, the controller 180 can output the initial execution screen 511 on one area in a scaling-down manner or in a popping-up manner while continuously outputting the execution screen 514 with the fourth depth.

As such, when a first task screen jumps to a third task screen, a notification icon 520 notifying the jump to the initial execution screen 511 can be output on one area of the third task screen, for example, on a center or lower end of the initial execution screen 511 of the message application. Meanwhile, when jumping from the currently-used message application directly to a screen of the last execution screen of a previously-used another application, notification information notifying the jumped application can be output.

Figure 5B:
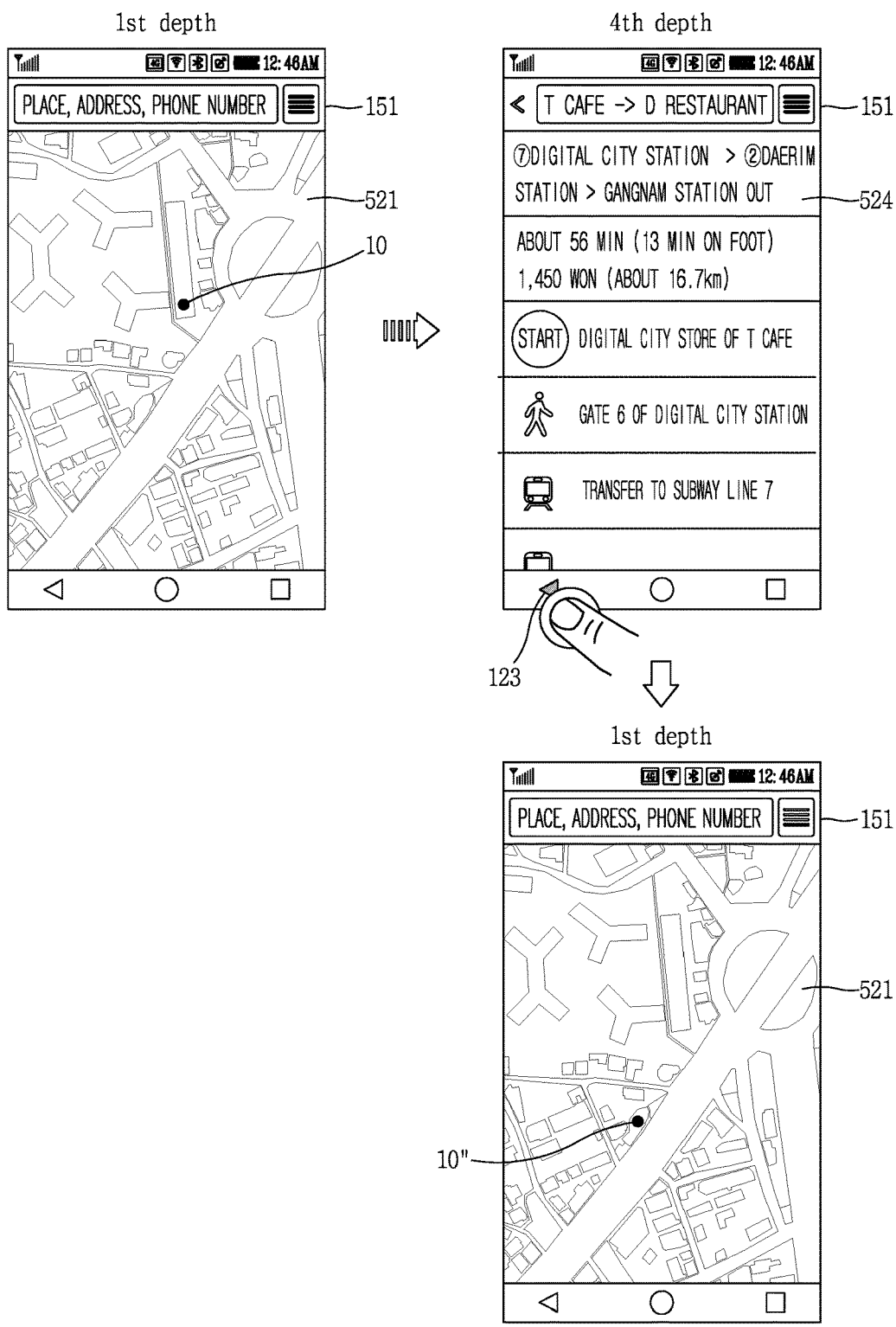

As another embodiment of the present invention, FIG. 5B illustrates processing of an example of jumping (going, moving) to an initial execution screen of an application when information included in a first-depth screen of a map application is updated while the screen with the first depth jumps to a screen with a fourth depth.

First, an object 10 indicating a current position of the mobile terminal 100 can be output on an initial execution screen 521 of the map application in FIG. 5B. The initial execution screen 521 can be switched (changed) to an execution screen 524 with a fourth depth according to a plurality of user manipulations. In the output state of the execution screen 524 with the fourth depth ('first task screen'), when a touch exceeding reference pressure is applied to the back key 123, the execution screen 524 with the fourth depth can jump to the initial execution screen 521 ('third task screen') of the map application.

In this instance, while the initial execution screen 521 is switched to the execution screen 524 with the fourth depth according to the user manipulation, at least part of information output on the initial execution screen 521, for example, a current position of the mobile terminal 100 can be updated. According to the execution result of going back directly to the initial execution screen 521, the updated information, namely, the changed current position 10″ can be output on the displayed initial execution screen 521.

Further, as another example, when the screen jumped thereto based on the touch input applied to the back key 123 is an initial screen of a website including at least one news, updated news which has not been output before may further be displayed. This provides the same effect as the result of pressing a refresh key after going back to an initial step by manipulating the back key several times on a current task screen.

Figure 5C:
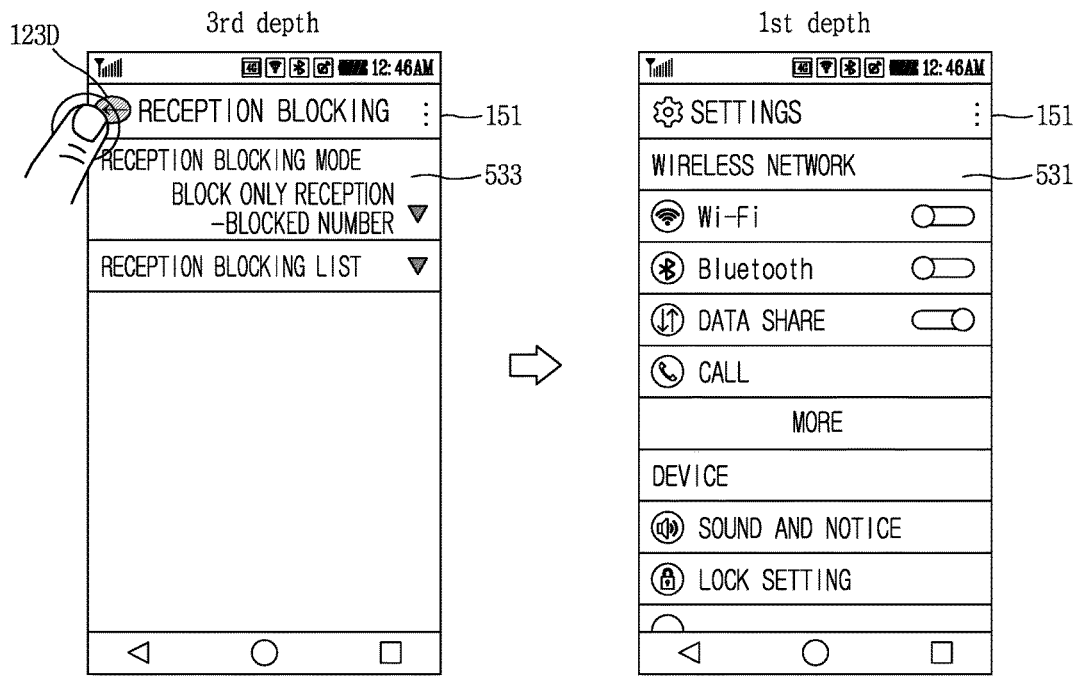

Also, as one embodiment of the present invention, FIG. 5C illustrates an example of outputting the back key, which is used for going directly to an initial screen from a screen with a third depth of a setting application, on an upper portion of the display unit 151. In more detail, upon entering an execution step with more than a first depth in the setting application, a go-back key 123D may be generated on an upper end of a corresponding page 533. Even when a touch exceeding reference pressure is applied to the generated go-back key 123D, the same operation as that illustrated in the aforementioned embodiments may be performed. That is, the displayed execution screen 533 with the third depth jumps directly to an initial execution screen 531 of the setting application.

However, the go-back key 123D disappears as soon as the initial execution screen 531 of the setting application is output. Therefore, in order to go back directly to another application which was used before the setting application, the back key output on the lower end of the display unit 151 should be used. That is, jumping between applications by use of the go-back key 123D is restricted.

Figure 5D:
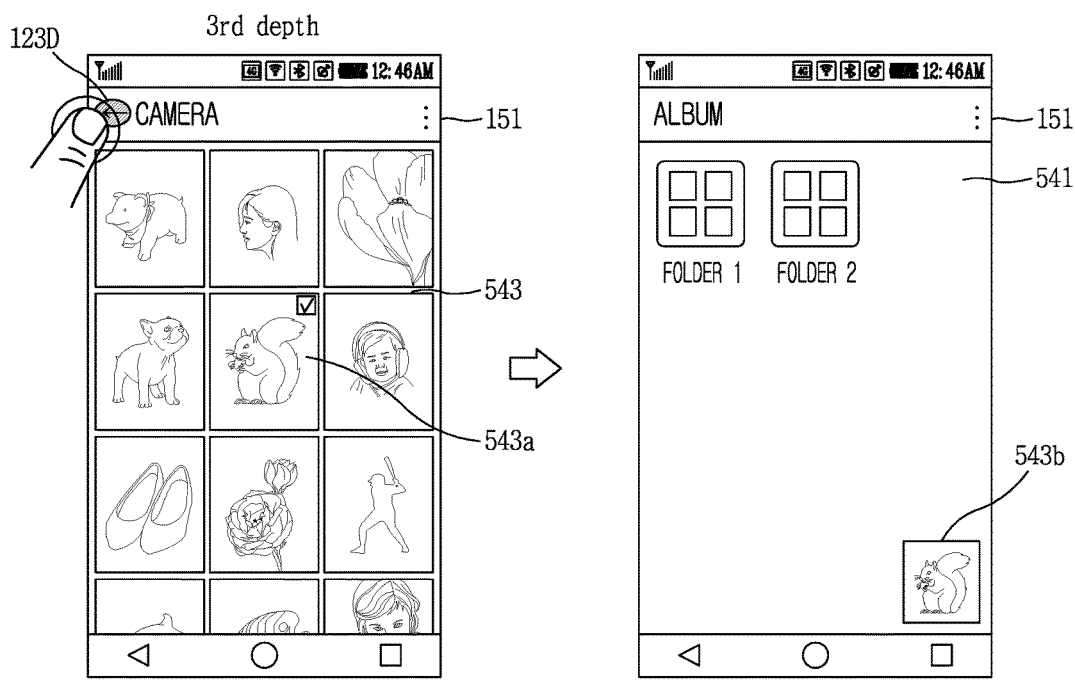

As one embodiment of the present invention, FIG. 5D illustrates an example of forwarding at least part of an operation executed on a first task screen to a third task screen. In FIG. 5D, when a third-depth execution screen 543 of a gallery application is output on the display unit 151, at least one input information may be input through a touch input applied to the corresponding screen. As one example, as illustrated in FIG. 5D, a specific image 543a may be selected from a plurality of images.

Prior to executing an additional operation after the image selection, when a touch input exceeding reference pressure is applied to the go-back key 123D output on the upper end of the display unit 151, a specific image 543a for which a task has not been completed can be output on one area of an initial execution screen 541 of the gallery application (543b). In more detail, when a touch input exceeding the reference pressure is applied to the key 123D, a first task screen can jump to a third task screen and simultaneously at least part of input information executed on the first task screen can be output on one area of the third task screen.

When a touch is applied to the image 543b output on the initial execution screen 541 of the gallery application, the controller 180 can execute going directly back to the execution screen 543 with the third depth so as to execute the incomplete task.

Figure 5E:
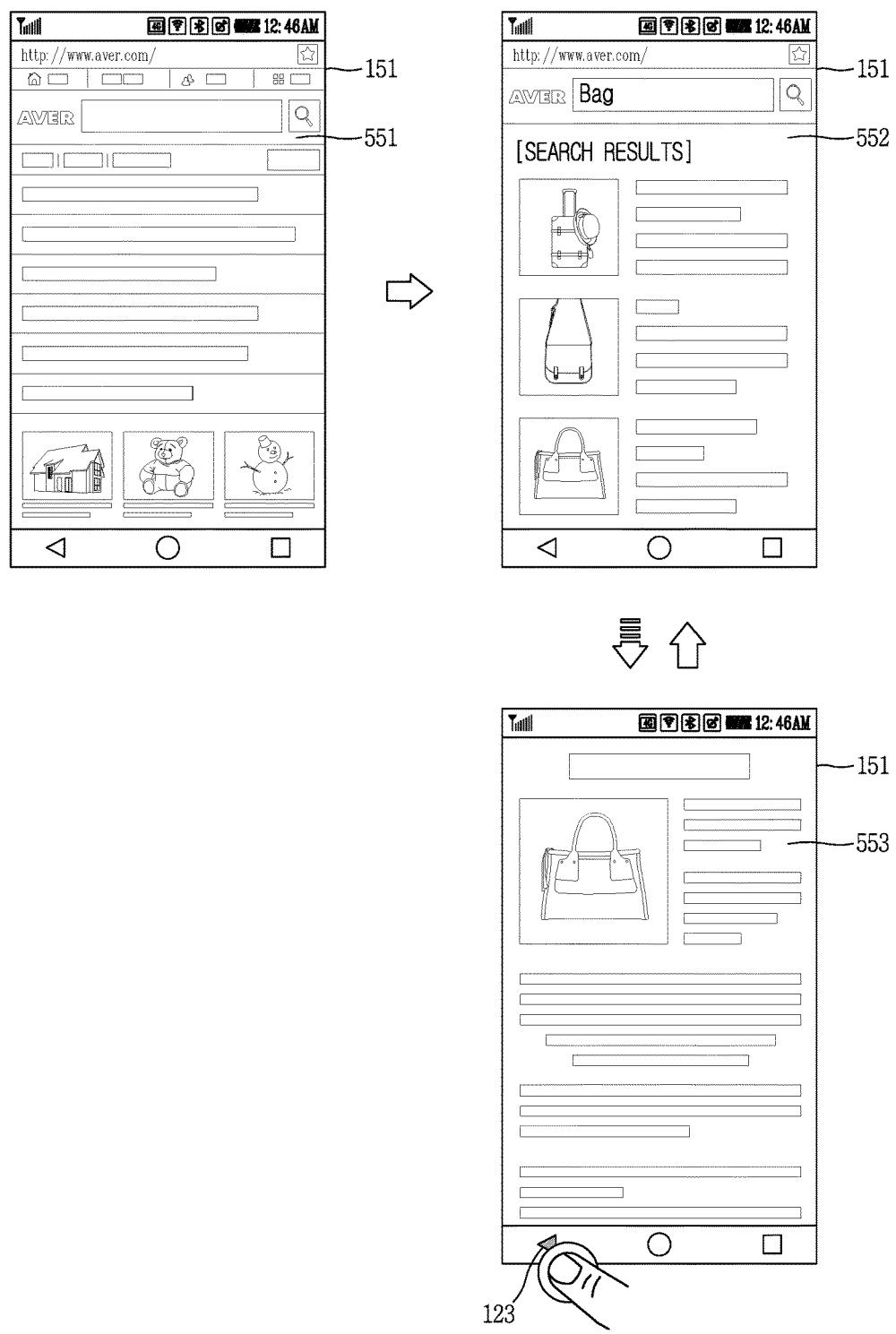

As one embodiment of the present invention, FIG. 5E illustrates an example of first viewing a specific execution step without going back to an initial screen of an application from a screen moved in response to a touch input applied to the back key. In FIG. 5E, when an initial screen 551 of a web search application is output and 'Bag' is input as a search word on the initial screen 552, a corresponding search result screen 552 can be output.

While a final screen 553 moved thereto through plural manipulations is output after the search result screen 522 is output, when a touch input exceeding reference pressure is applied to the back key, the controller 180 can control the display unit 151 to output the initial search result screen 552 of the keyword associated with at least the final screen 553. In more detail, when the first task screen output on the display unit 151 at a time point that the touch input exceeding the reference pressure is applied to the back key meets a predetermined condition, the first task screen can jump to a screen of a specific execution step associated with the predetermined condition before going back to the initial execution screen of a currently-used application or without outputting the initial screen.

In addition, the predetermined condition may refer to a condition included when a plurality of screens switched (changed, moved) according to user manipulations coming from a specific execution step. The predetermined condition can differently be decided according to a type of a currently-used application.

For example, as illustrated in FIG. 5E, when the first task screen is a page coming from the search result with respect to the specific keyword, while a touch input exceeding reference pressure is applied to the back key 123, the initial search result screen 552 with respect to at least the specific keyword can be output.

As another example, regardless of whether or not the first task screen meets the predetermined condition, a screen of an execution step, which meets a second condition, among task screens displayed while moving (turning over) from an initial execution screen of a currently-used application to the first task screen, can be output as the third task screen. In addition, the second condition may be one of cases associated with usage patterns, for example, when an access frequency by a user exceeds a reference value, when access frequencies by users to a corresponding application are high, when a use time exceeds a reference time, and the like.

According to the embodiment, the use of the back key allows for flexibly accessing a specific execution step according to situations, other than simultaneously going to an initial screen of a currently-used application or a screen of the last execution step of a previously-used application.

Figure 6:
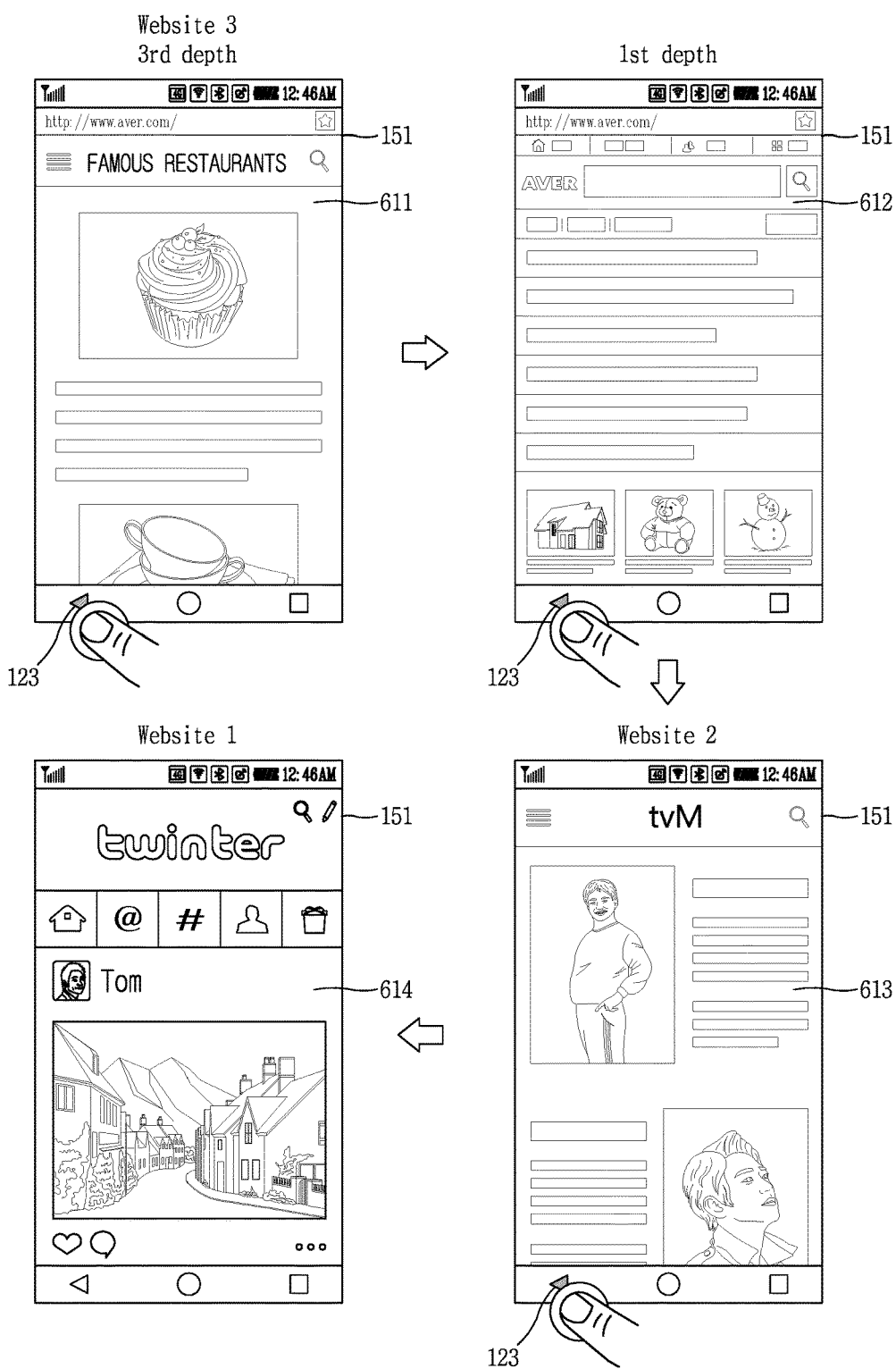

As another example related to this, FIG. 6 illustrates an example of jumping (going) directly to each of a plurality of websites which have been passed (accessed, opened) in one web application. In FIG. 6, after executing a web application, a third-depth execution screen of a website 3 can be output on the display unit 151 according to a user manipulation. In this state, when a touch exceeding reference pressure is applied to the back key, the third-depth execution screen can jump directly to an initial screen of the website 3.

Afterwards, when the touch exceeding the reference pressure is applied again to the back key, the initial screen of the website 3 jumps to a screen 613 of a website 2 which has been opened before the website 3, and jumps to a screen 614 of a website 1 in a similar manner. That is, directly jumping (switching, moving) between websites within a current-used web application, other than a different application used before using a currently-used web application, is executed.

Further, the controller 180 can generate guide indicators, which help each jumped website to be visually intuitive, on the screen 613, 614 of each website, to facilitate a visual recognition of the jumping between the websites.

Figure 7:
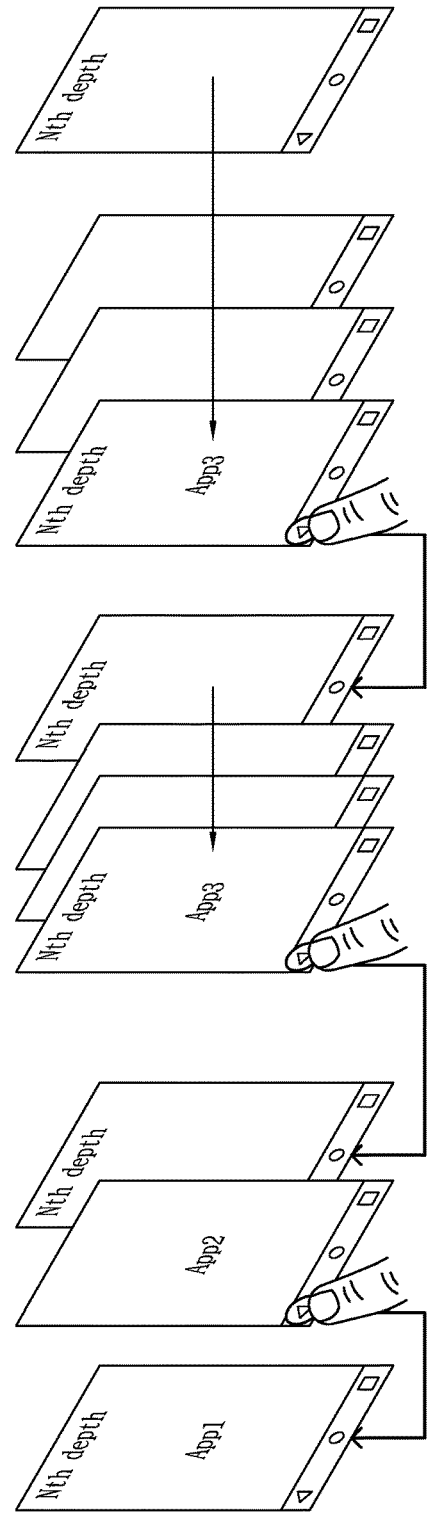

Next, FIG. 7 illustrates an example of adjusting a screen jumping speed based on touch attributes of a touch input when jumping among a plurality of applications, in response to a touch input exceeding a reference pressure, applied to the back key. First, the controller 180 of the mobile terminal 100 according to one embodiment disclosed herein can repeat jumping to another task screen corresponding to one of previously-executed tasks based on the jumped third task screen, while the touch input exceeding the reference pressure, applied to the back key, is maintained.

That is, the screen jumping corresponding to the third task screen is caused each time a touch is applied to the back key in the foregoing embodiment. Further, according to this embodiment, the screen jumping is repetitively caused while the touch input exceeding the reference pressure is applied to the back key and maintained without being released.

In this instance, the controller 180 can differently adjust a screen jumping speed based on at least one of touch attributes of a touch input applied to a menu key for cancelling a command input. In more detail, the controller 180 can increase or decrease the screen jumping speed according to touch strength of a touch input applied to the back key and exceeding the reference pressure, a touch-holding time, a number and interval of varying touch strength, addition or non-addition of a yaw operation, and the like.

For example, as a touch-holding time or touch strength of a touch input more increases, screen jumping (movement, change) can be intuitively accelerated and accordingly third task screens can be turned over faster. Also, for example, even when the number of varying the touch strength increases and the variation interval is shortened, or even when the yaw operation is added, the acceleration of the screen switching can be caused.

As such, when the third task screens are turned over too fast, the controller 180, as one example, can output a brake signal at each preset section during the screen jumping (movement, change) such that the user does not miss a desired execution step or application due to the screens being turned over (jumping) too fast. That is, the controller 180 can control the brake signal to be output at each preset section when the screen jumping is accelerated. In this instance, an execution screen corresponding to a section where the brake signal is generated can be output on the display unit 151.

Also, the preset section may refer to a specific execution step on a website within an application or a web application. In addition, the specific execution step may be an intermediate step or initial screen of turned-over pages, a step before jumping to another application, and the like.

Also, at the section where the brake signal has been generated, the screen jumping can temporarily be stopped or a feedback signal such as vibration, sound and the like can be output. For example, while jumping among websites within a web application, first and last pages of each website can be output with the main body vibrated. This helps fast executing the screen jumping without skipping (missing) a desired execution step.

So far, the foregoing description has been given of the embodiments of fast jumping to an initial screen of a currently-used application, a screen of the last execution step of a previously-used different application, or a screen of a preset specific section, by using a touch input applied to the back key.

Figure 8A:
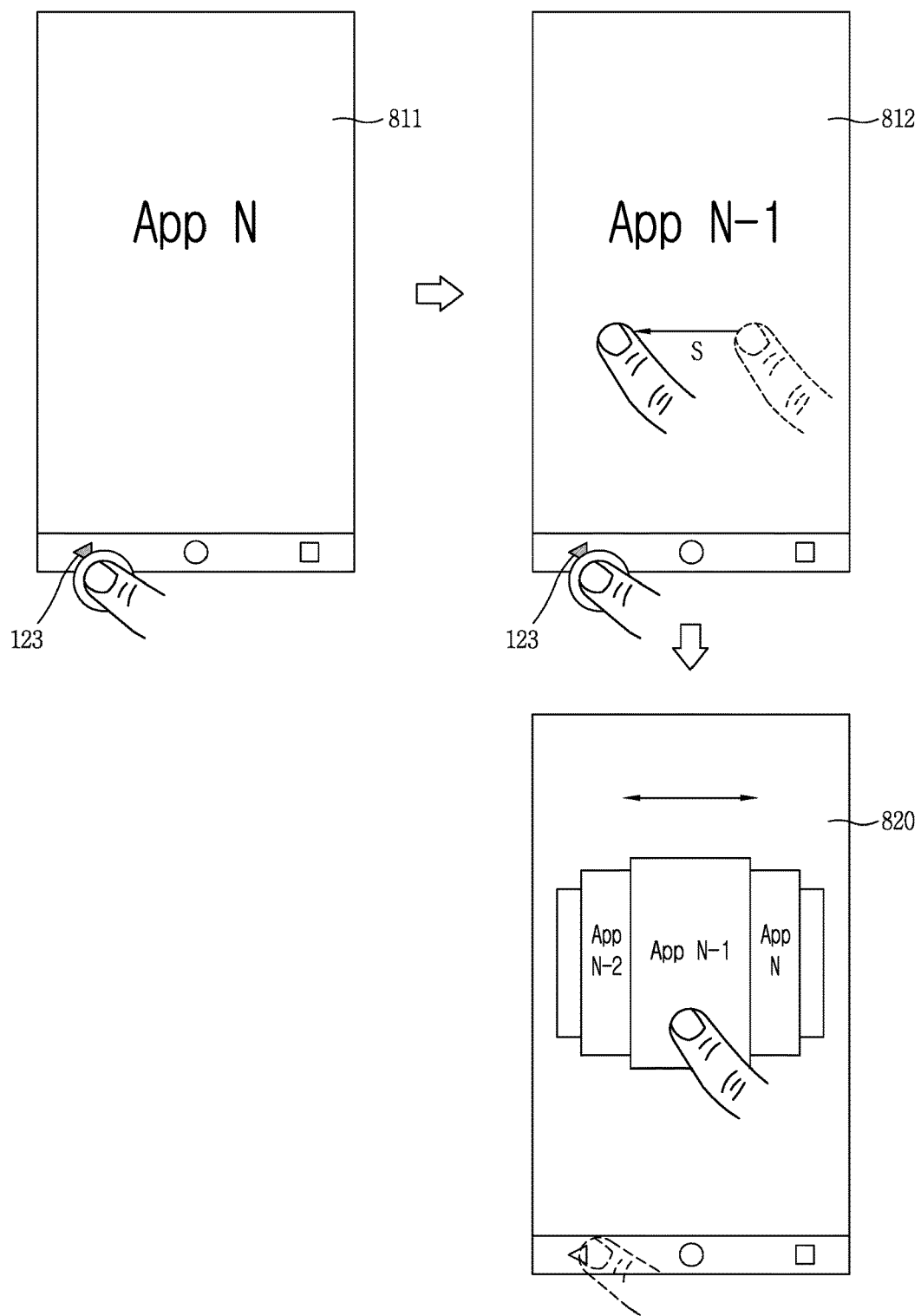
Figure 8B:
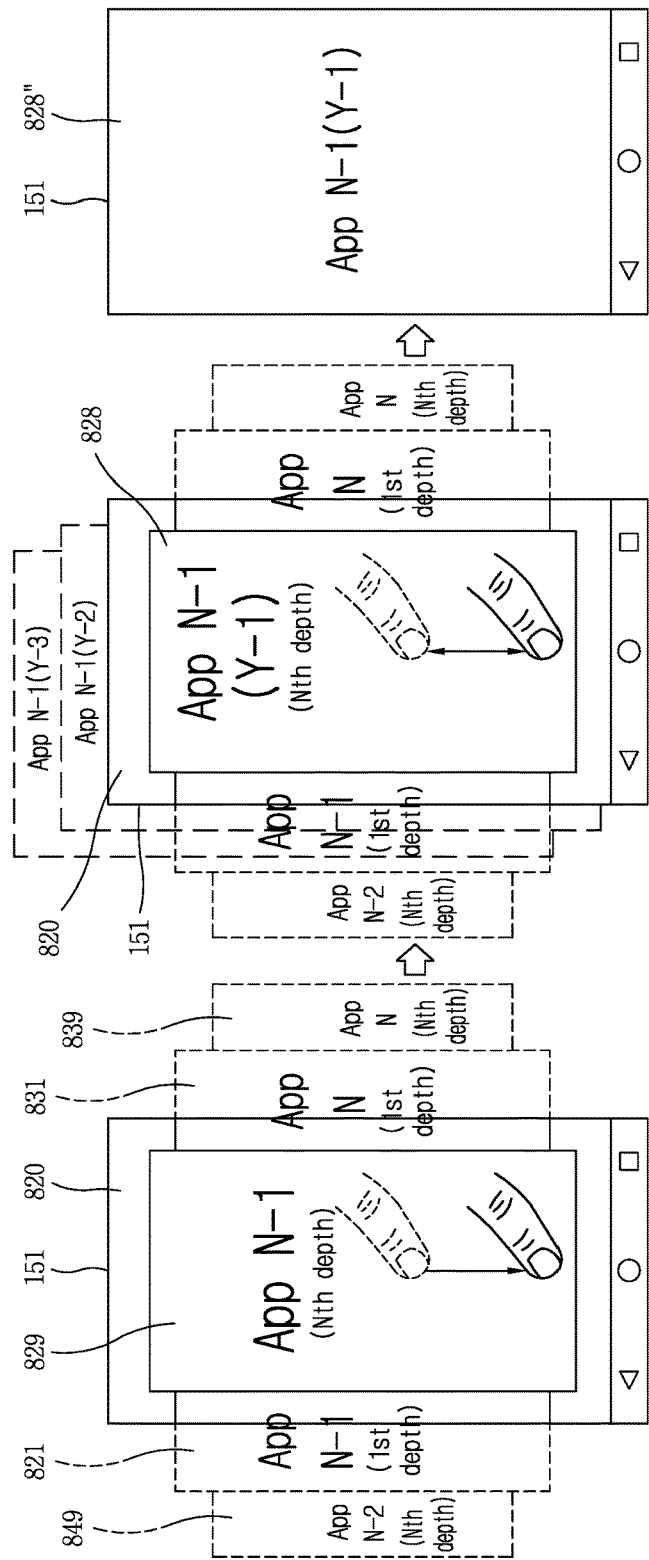
Figure 8C:
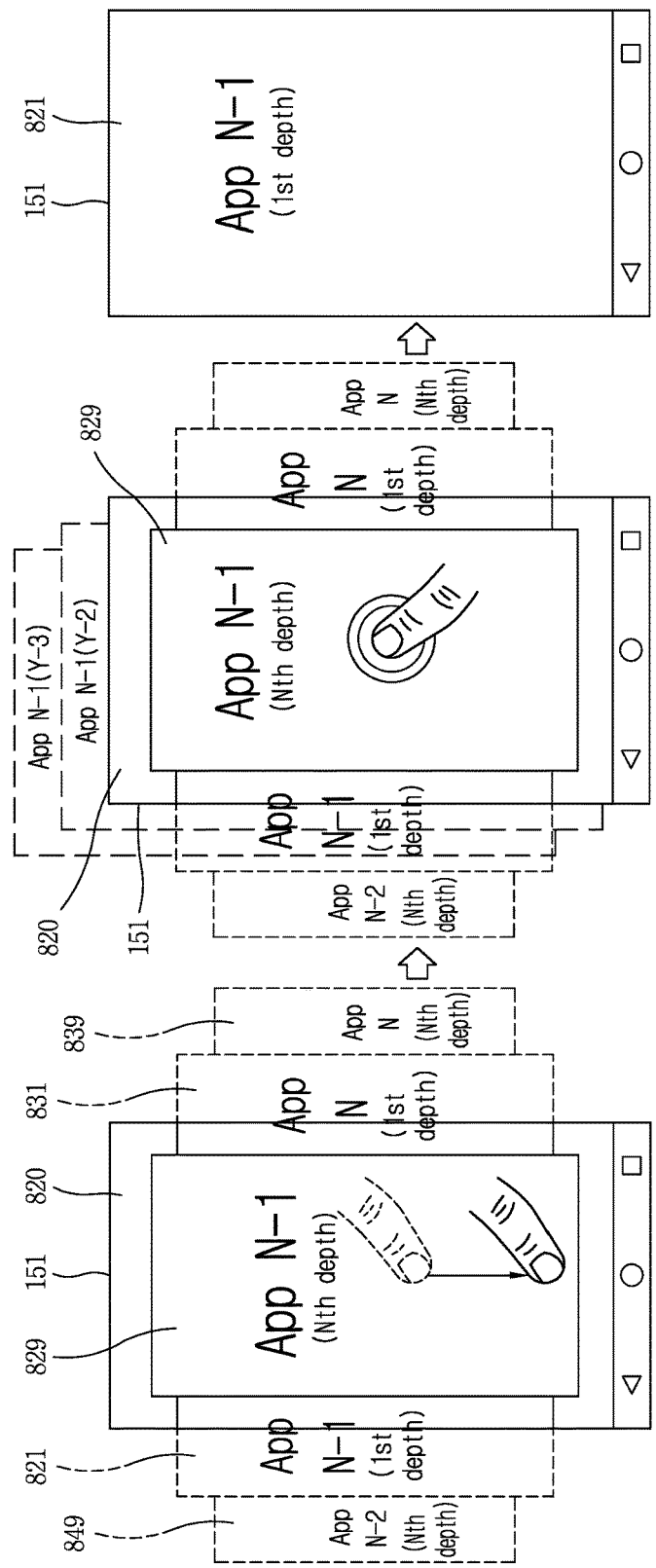

Hereinafter, FIGS. 8A, 8B and 8C illustrate embodiments of fast jumping to a screen of a desired step, without repetitively applying a single touch to the back key, even when a screen of a step to which the user desires to go back does not correspond to the aforementioned condition.

As one embodiment, when a second touch is applied to the display unit 151 while the touch input exceeding reference pressure applied to the back key is maintained in the output state of a first task screen, the controller 180 can output the third task screen (or the first task screen) in a manner that images corresponding every execution step of previous tasks associated with the first or third task screen are selectable. In addition, the second touch may be one of a single touch, a double touch, a swipe touch, a drag touch and a touch exceeding the reference pressure.

For example, as illustrated in FIG. 8A, after an output of an execution screen ('first task screen') 811 of an N-$^{th}$ application, the execution screen 811 has jumped back to an execution screen ('third task screen') 812 of an N-1$^{th}$ application, in response to a touch input exceeding reference pressure applied to the back key. In this state, when a touch input dragged in a preset direction is applied as the second touch (S) to the display unit 151, screen images 820 corresponding to every execution step of every used application are open like a book while outputting an effect of being shrunk into the output third task screen (or first task screen), namely, a visual effect like images on the screen being shrunk. Afterwards, the screen images 820 are continuously output even though the touch screen applied to the back key is released.

As such, when the screen images 820 are output, any step of previously-executed tasks can immediately be accessed based on an additional touch input applied to the screen images 820. For example, as illustrated in FIG. 8B, when a swipe/drag input is applied up and down to the screen images 820, the controller 180 can precisely select a specific step of a specific application corresponding to a central image of the currently-output screen images 820. This allows for jumping to a screen Y-1 828 of a previous execution step of a screen 829 of the last execution step in the N-1$^{th}$ application. Upon applying a touch once more, those screen images 820 may disappear and simultaneously a screen of a Y-1$^{th}$ execution step of the N-1$^{th}$ application can be output on the full display unit 151.

Also, when a swipe/drag input is applied to the screen images 820 in left and right directions, the controller 180 can fast enter an initial screen or a screen of the last execution step of each of applications, which have been used after or before using a specific application displayed on a center of the currently-output screen images 820.

Also, as illustrated in FIG. 8C, when a touch exceeding reference pressure is applied to a central image 829 of those screen images 820, the screen images 820 disappear and simultaneously a currently-output screen jumps to an initial execution screen of the N-1$^{th}$ application.

As aforementioned, in the present invention, when a touch exceeding reference pressure is applied to the back key while a first task screen is output, a third task screen, in which at least one input value set for the first task screen has been initialized or tasks of applications included in the first task screen have been initialized, can be output.

Figure 9:
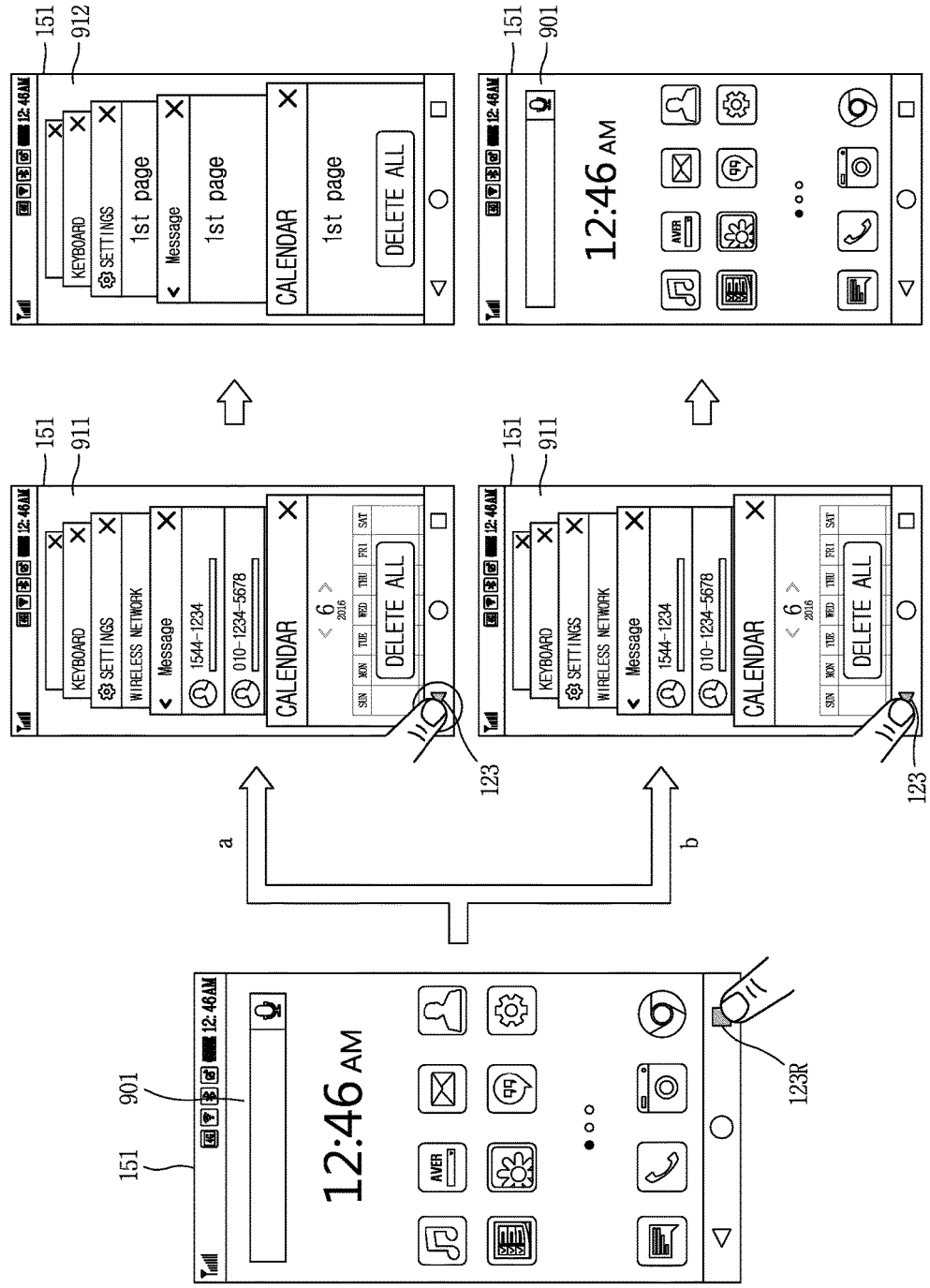

In relation to this, FIG. 9 illustrates one example of initializing an execution step of each application when recently-used applications are all output. As illustrated in FIG. 9, when a home screen 901 is output on the display unit 151, for example, when a touch is applied to a recent Apps key 123R output/arranged on a lower end of the display unit 151, recently-executed (open) screens 911 ('first task screen') of recently-used applications are open on the display unit 151.

In this state, when a touch is applied with normal strength to the back key 123 located in parallel to the recent Apps key 123R, the currently-open screens 911 are switched into a previously-output home screen 901 ('second task screen'). That is, a recently-used application view is terminated.

Meanwhile, as an operation (a) according to an embodiment disclosed herein, when a touch is applied to the back key 123 with pressure exceeding reference pressure, each execution step of the recently-open screens 911 of the recently-used applications is initialized to an initial execution step at once (912). That is, the applications corresponding to the recently-open screens 911 all jump back to first pages, respectively, while maintaining the executed state of each of the applications.

In addition, according to one embodiment, an initialization range of the applications may differently be decided according to a touch degree of a touch exceeding reference pressure, applied to the back key 123, in the output state of the recently-executed screens 911. For example, as the touch degree of the touch applied to the back key 123 increases, an initialization operation may gradually be executed, starting from an execution step of the most-recently-used application to an execution step of the last-used application.

Figure 10:
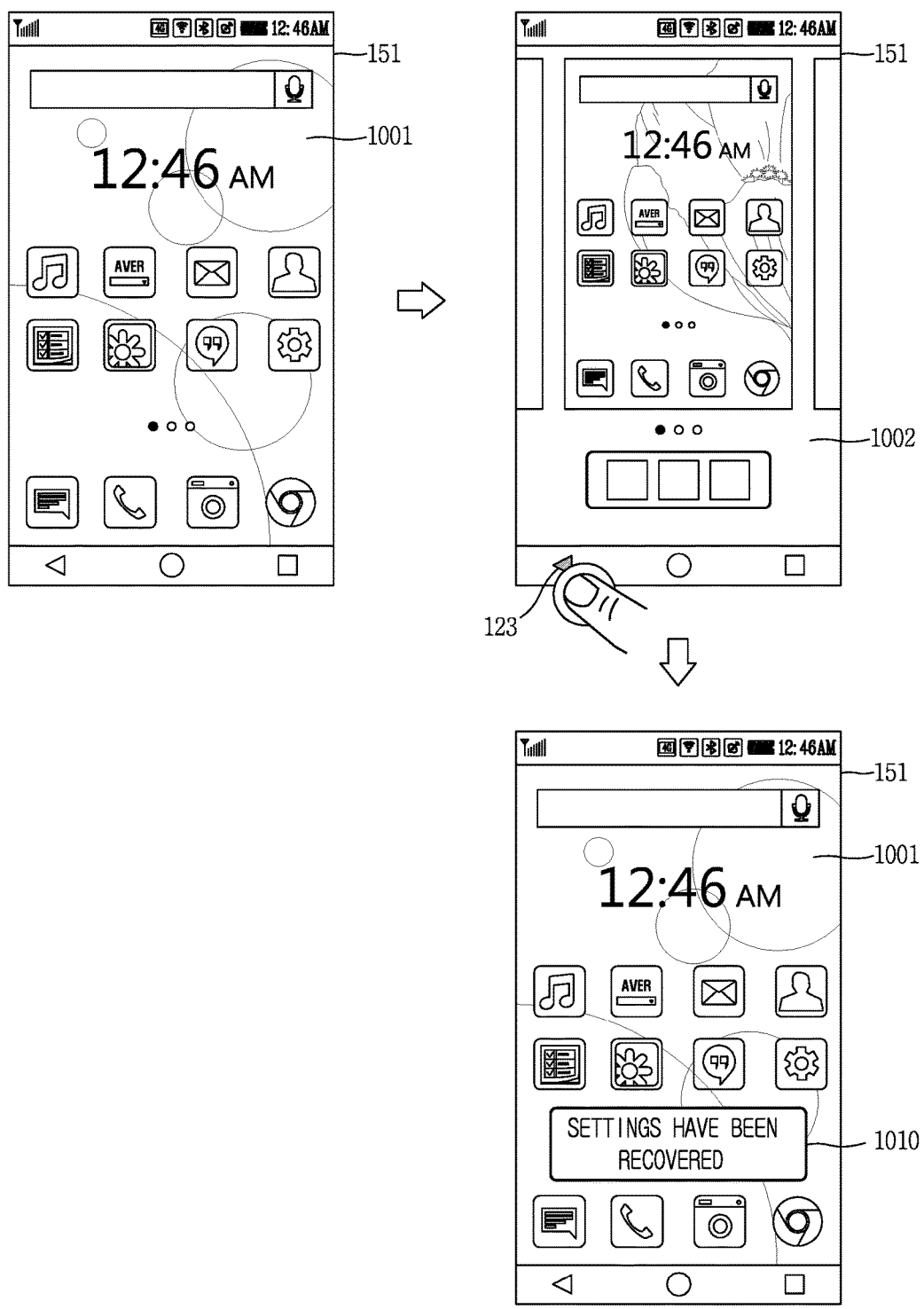

Next, FIG. 10 illustrates an example of fast recovering a setting-changed state of the home screen 151 to a setting state before the change using the back key. As illustrated in FIG. 10, in an output state of a home screen 1001 on the display unit 151, settings for the home screen 1001 may variously be changed according to user manipulations. For example, at least one of a background image of the home screen 1001, an arrangement of icons, an edition of icons, a background image of a lock screen and the like may be changed.

In an output state of a setting-changed home screen 1002 ('first task screen'), when a touch exceeding reference pressure is applied to the back key 123 output on the lower end of the display unit 151 within a predetermined time (e.g., 10 minutes), the controller 180 can recover the changed setting to a previous state, namely, a previous setting value. Accordingly, the home screen 1001 having the original background image back can be output, and in this instance, a notification icon 1010 notifying that the setting has been recovered can be output on a lower end of the home screen 1001 for a predetermined time and then disappear.

In this instance, when a setting value applied to the home screen 1002 is in plurality, only some of changed setting values can also be recovered by varying a touch degree of a touch input exceeding the reference pressure, applied to the back key 123. Alternatively, setting values applied to the home screen 1002 may alternatively be recovered in reverse order of change, in proportion of a lasting (holding) time of the touch input applied to the back key 123.

Thus, the controller 180 can store setting values before change and pre-applied setting values in a temporary memory and the like for at least a preset time, and then extract associated information when a touch input is applied to the back key 123. According to this embodiment, the pre-applied setting values can be recovered more easily and fast using the back key 123 without having to change setting values changed on the home screen by entering an edit mode.

Figure 11:
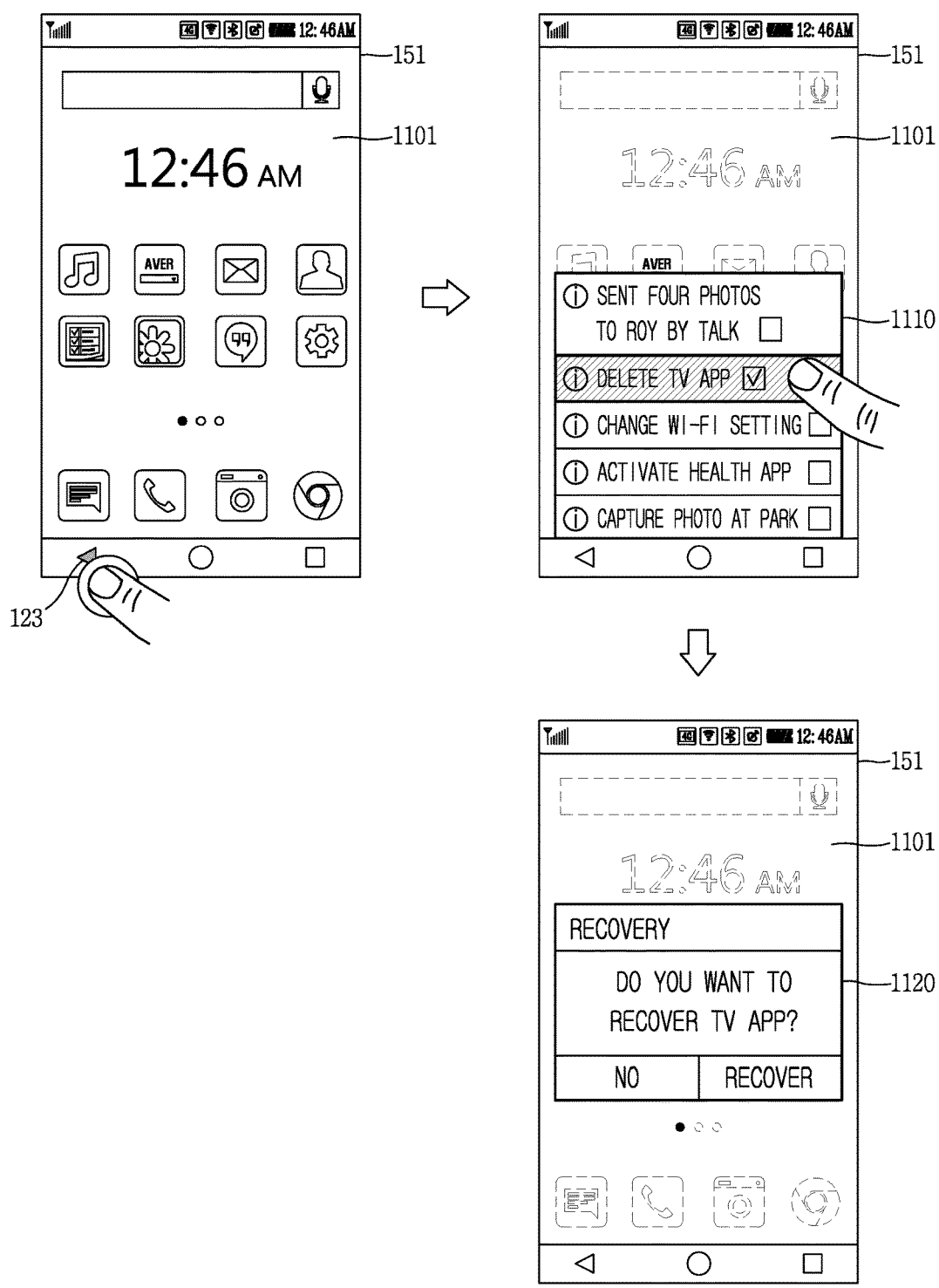

Also, as one embodiment, FIG. 11 illustrates histories of task items executed on the mobile terminal 100 for a preset time using a back key when any changed setting value is not present on the home screen 151. As illustrated in FIG. 11, when a home screen 1101 ('first task screen') is output on the display unit 151, when a normal touch is applied to the back key 123, any screen change is not occurred. That is, for the home screen 1101 even without a changed setting value, the second task screen may not exist.

Meanwhile, after the output of the home screen 1101, when a touch input exceeding reference pressure is applied to the back key 123, the controller 180 can output a list 1110 of task items previously executed on the mobile terminal 100 for a preset time, for example, in a form of a popup window, on an upper layer of the home screen 1101, namely, one area of the corresponding screen 1101. In this instance, the lower-layered home screen 1101 may be changed into an inactive state.

The list 1110, for example, provides a history of tasks executed for 24 hours on the mobile terminal 100. For example, the list 1110 may output tasks, such as data transmission (e.g., transmission of four photos), a deletion of an application (e.g., deletion of a TV App), a setting change of the mobile terminal (e.g., Wi-Fi setting change), an execution of an application (e.g., health App, image capturing) and the like, in the order of a task time.

Thus, the controller 180 can continuously execute on a background a trashcan function for all of the tasks executed on the mobile terminal, namely, a function of temporarily storing those tasks until before emptying the trashcan. Also, information which is stored according to the function may continuously be maintained for a predetermined time (e.g., 24 hours) even though the mobile terminal is switched into a power-off state.

When a touch is applied to a specific task item (e.g., 'delete the TV App') on the list 1110, a notification window 1120 on which guide information (e.g., 'Do you want to recover the TV App?') for recovering the selected specific task item to a previous state is popped up. The deleted application may be recovered or the corresponding task (deletion of the TV App) may be maintained by inputting a response to the popped-up notification window 1120. Accordingly, tasks executed on the mobile terminal for a predetermined time can fast be checked using a touch input, and at least one task can be recovered to a previous state according to a user selection.

Figure 12A:
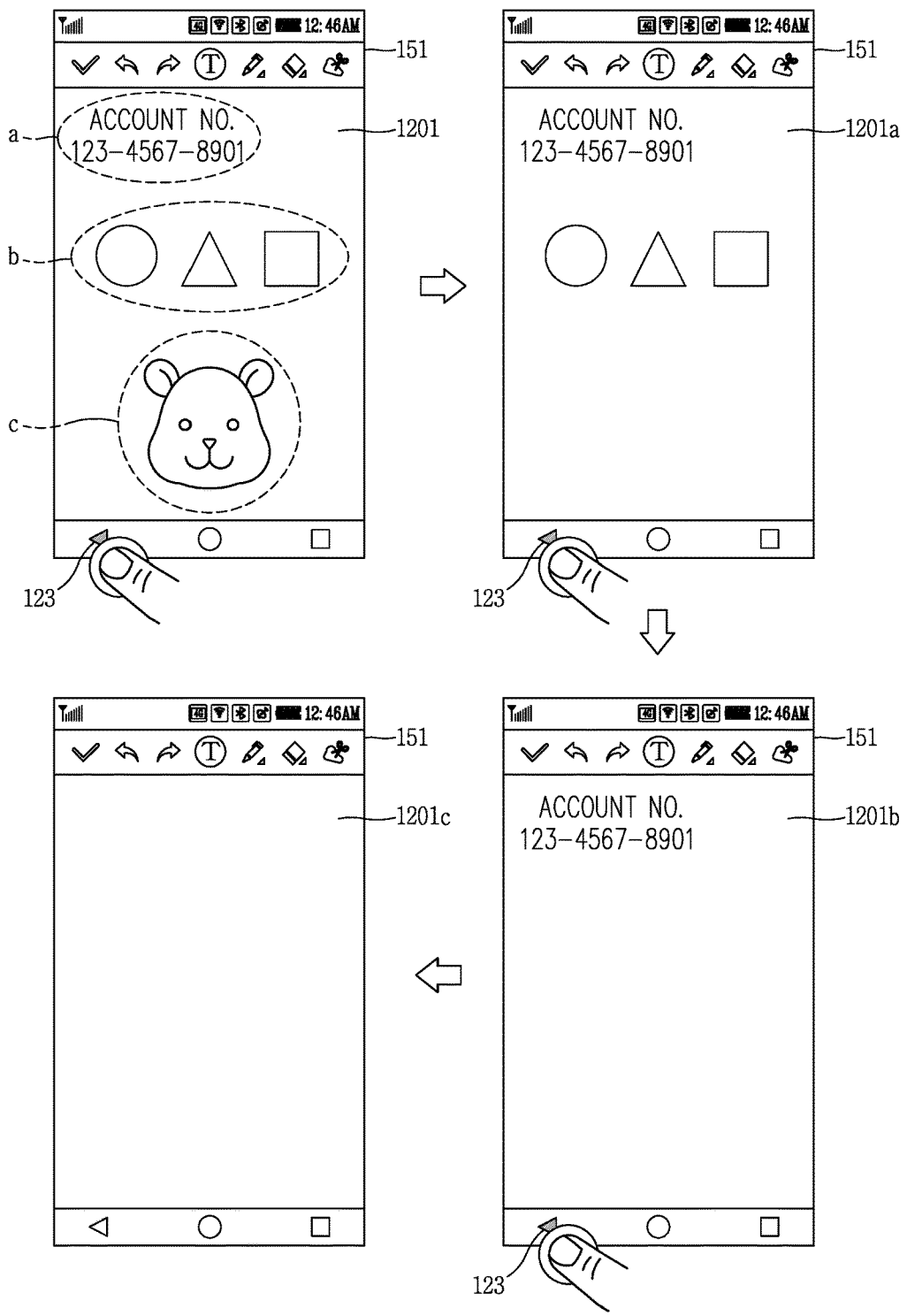
Figure 12B:
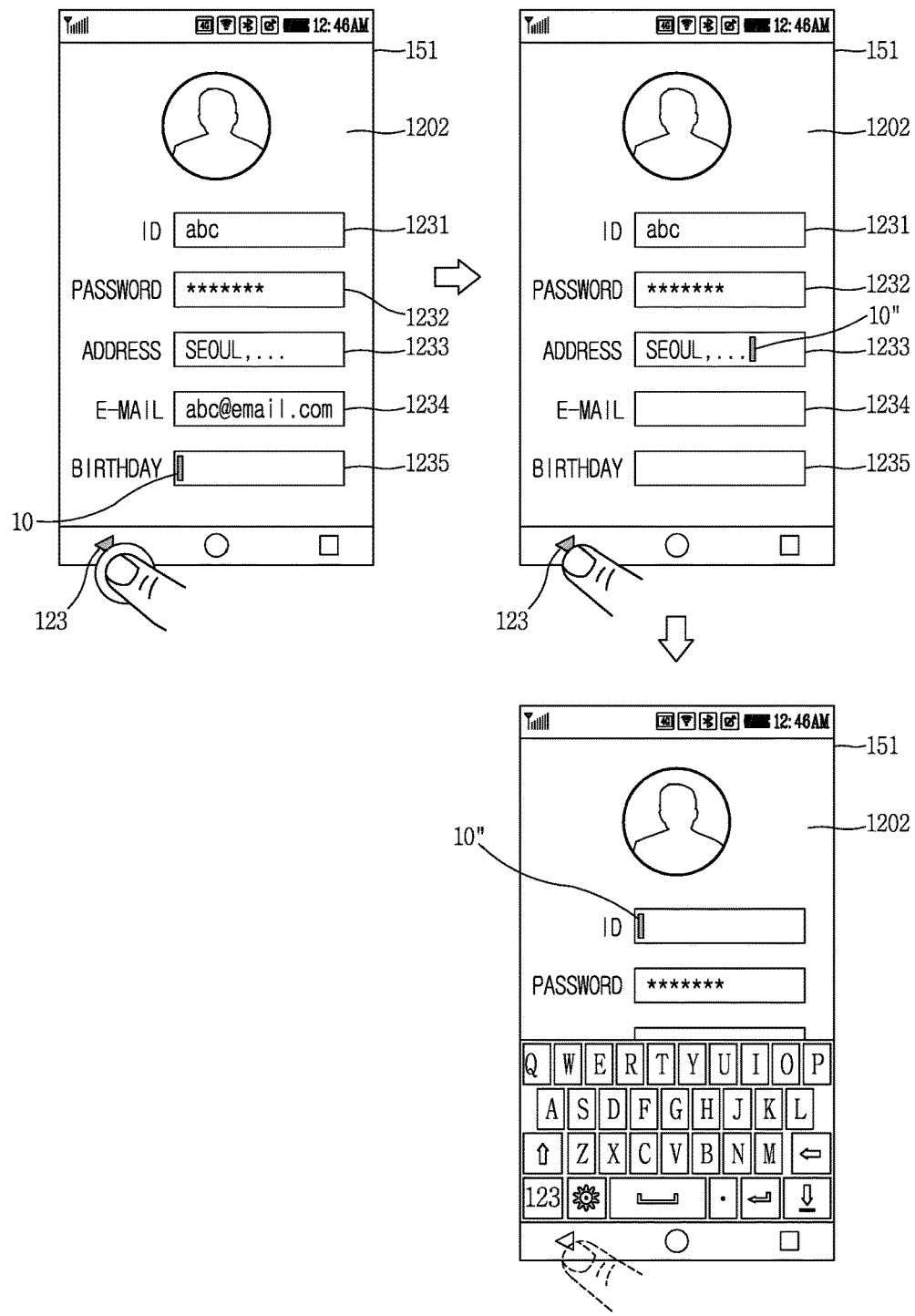

Next, FIGS. 12A and 12B illustrate examples of fast deleting pieces of information output on an input screen using the back key. In more detail, the controller 180 can delete a plurality of input information in reverse order of input while a touch input exceeding reference pressure is applied to the back key in an output state of the first task screen including the plurality of input information.

For example, as illustrated in FIG. 12A, an execution screen of a memo application output on the display unit 151 may output thereon a plurality of input information a, b and c with different attributes. In addition, the different attribute refers to a different input type, for example, may refer to an input using a different input tool, such as text using a virtual keyboard, a figure using a tool, handwriting and the like. Therefore, the plurality of input information having the different attributes refer to a plurality of information input by using different input tools.

As such, in an output state of an input screen ('first task screen') 1201 including the plurality of input information a, b and c, when a touch input exceeding reference pressure is applied to the back key arranged on the lower end of the display unit 151, the plurality of input information a, b and c are deleted in reverse order of input, in proportion to a lapse of a lasting (holding) time of the touch input or an increase in a number of applying the touch input.

That is, the controller 180 can restrict an operation for implementing a previous screen of the input screen (e.g., outputting a popup window for checking whether or not to close the input screen or store input information) or an output of a context menu associated with the input information, and sequentially delete the input information in reverse order of input.

Accordingly, on the displayed input screen 1201, first input information c which has been input the latest is first deleted (1201a), the second input information b which has been input just before the first input information c is then deleted (1201b), and the third input information a which has been input first is finally deleted. Thus, the input screen 1201 becomes an empty screen 1201c. As such, a preset notification signal, for example, sound, vibration and the like, can be output every time the input information is deleted.

Further, when a touch degree of a touch input exceeding reference pressure, applied to the back key, has a maximum level, the controller 180 can also delete those pieces of input information at once, other than in a sequential manner.

Next, FIG. 12B illustrates an example of deleting a plurality of input information without moving a cursor when the plurality of input information are input in different input areas. In FIG. 12B, when a plurality of user information are input on one page 1202, each of the user information may be input in a different input space 1231, 1232, 1233, 1234 and 1235. For example, after moving a cursor 10 to the first input space 1231, ID information abc may be input using a virtual keyboard or the like. Afterwards, the cursor 10 may be moved to the second input space 1232 through a preset input, to input next user information (e.g., password). Therefore, even when deleting a plurality of user information which have been input, an additional operation for moving the cursor to an input space with user information desiring to delete is needed.

Meanwhile, according to an embodiment of the present invention, even when the plurality of user information are input in different input spaces, a touch input exceeding reference pressure may be applied to the back key, and thus the user information can be deleted in reverse order of input.

As illustrated in FIG. 12B, in the state that different types of user information are input in the first input space 1231, the second input space 1232, the third input space 1233 and the fourth input space 1234, respectively, and the cursor 10 is located, for example, on the fifth input space 1235 on a user information input screen 1202, when a touch exceeding reference pressure is applied to the back key, the controller 180 deletes each input user information with moving the cursor 10 sequentially to the fourth input space 1234, the third input space 1233, the second input space 1232 and the first input space 1231 while the touch is maintained. Accordingly, when the cursor 10 is finally located on the first input space 1231, the deletion of the input information is terminated. Afterwards, a virtual keyboard may automatically be activated to allow an input operation.

According to this embodiment, without having to delete input information one by one using an eraser function or deleting input information one by one by moving a cursor to different input spaces, pieces of information having different attributes or input in different input spaces can be deleted easily and fast by applying a touch to the back key.

As described above, according to a mobile terminal and a method for controlling the same of the present invention, a current execution step of a currently-used application can jump directly to a specific step or to a previously-used different application by using a touch input applied to a back key. Also, in a setting-changed state, a pre-applied setting can fast and easily be recovered to a previous state using a touch input applied to the back key.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
a wireless communication processor configured to provide wireless communication;
a display; and
a hardware processor configured to:
display a third task screen corresponding to a first application on the display, wherein at least a second task screen and a first task screen are previously displayed on the display, the third task screen is linked with the previously displayed second task screen and the second task screen is linked with the previously displayed the first task screen,
in response to a touch input applied to a back key on the mobile terminal that is equal to or lower than a reference pressure while the third task screen is displayed, display the second task screen on the display,
in response to the touch input applied to the back key on the mobile terminal that exceeds the reference pressure while the third task screen is displayed, jump from the third task screen to the previously displayed first task screen such that the first task screen is displayed on the display,
wherein, in response to a touch input applied to the back key on the mobile terminal that is equal to or lower than the reference pressure while the first task screen is displayed on the display, display a home screen on the display, and
wherein, in response to the touch input applied to the back key on the mobile terminal that exceeds the reference pressure while the first task screen is displayed on the display, jump back to a previously displayed fourth task screen corresponding to a second application which has been used before the first application.

2. The mobile terminal of claim 1, wherein the hardware processor is further configured to:
display the first task screen at a released time point of the touch input, and
display a notification icon on one area of the first task screen to notify that the hardware processor has jumped from the third task screen to the first task screen.

3. The mobile terminal of claim 1, wherein the hardware processor is further configured to:
update information displayed on the first task screen while the third task screen is displayed on the display, and
display the first task screen including the updated information in response to the touch input exceeding the reference pressure being applied to the back key.

4. The mobile terminal of claim 1, wherein the hardware processor is further configured to display at least part of information input on the third task screen on one area of the first task screen while jumping from the third task screen to the first task screen, in response to the touch input exceeding the reference pressure being applied to the back key.

5. The mobile terminal of claim 1, wherein the hardware processor is further configured to display a screen notifying an initial search result with respect to at least a specific keyword while the touch input exceeding the reference pressure is applied to the back key, when the third task screen is associated with a search result for the specific keyword.

6. The mobile terminal of claim 1, wherein the hardware processor is further configured to:
repeat jumping to another task screen corresponding to a task executed before the first task screen, while the touch input exceeding the reference pressure applied to the back key is maintained, and
differently adjust a screen jumping speed based on at least one touch attribute of the touch input applied to the back key.

7. The mobile terminal of claim 6, wherein the hardware processor is further configured to display a brake signal at each predetermined section while jumping to the first and other task screens, in response to the touch input exceeding the reference pressure being applied to the back key, and
wherein the predetermined section corresponds to a specific execution step of an application or website.

8. The mobile terminal of claim 1, wherein the hardware processor is further configured to selectably display images corresponding to each execution step of previous tasks associated with the third or first task screen, in response to another touch being applied to the display while the touch input exceeding the reference pressure applied to the back key is maintained.

9. The mobile terminal of claim 1, wherein the hardware processor is further configured to jump from a recent execution step of each application into an execution initial step, in response to the touch input exceeding the reference pressure being applied to the back key while a screen viewing currently-executed applications is displayed as the third task screen.

10. The mobile terminal of claim 1, wherein the hardware processor is further configured to display, as the first task screen, the home screen recovered to a state before setting information is changed, in response to the touch input exceeding the reference pressure being applied to the back key after the change in the setting information regarding the third task screen.

11. The mobile terminal of claim 1, wherein the hardware processor is further configured to:
display a list of task items executed for a preset time on one area of the home screen when the home screen is displayed as the third task screen at a time point that the touch input exceeding the reference pressure is applied to the back key, and
execute an application associated with a selected at least one task item and recover the application to a state before the task when the at least one task item is selected from the list.

12. The mobile terminal of claim 1, wherein the third task screen includes a plurality of input information, and
wherein the hardware processor is further configured to, when the plurality of input information are provided on a plurality of different input areas or have different attributes, delete the plurality of input information in reverse order of input, while the touch input exceeding the reference pressure applied to the back key is maintained.

13. The mobile terminal of claim 1, wherein the first task screen corresponds to an original screen without at least one setting value set for the third task screen.

14. The mobile terminal of claim 1, wherein the application includes at least the previously displayed first and second task screens, and
wherein the first task screen corresponds to a first level screen of the application, the second task screen corresponds to a second level screen deeper than the first level screen, and the third task screen corresponds to a third level screen deeper than the second level screen.

15. A method of controlling a mobile terminal, the method comprising:
displaying a third task screen corresponding to an application on a display of the mobile terminal, wherein at least a second task screen and a first task screen are previously displayed on the display, wherein the third task screen is linked with the previously displayed second task screen and the second task screen is linked with the previously displayed the first task screen;
in response to a touch input applied to a back key on the mobile terminal that is equal to or lower than a reference pressure while the third task screen is displayed, displaying, via a hardware processor of the mobile terminal, the second task screen on the display; and
in response to the touch input applied to the back key on the mobile terminal that exceeds the reference pressure while the third task screen is displayed, jumping, via the hardware processor, from the third task screen to the previously displayed first task screen such that the first task screen is displayed on the display,
wherein the jumping further comprises:
in response to a touch input applied to the back key on the mobile terminal that is equal to or lower than the reference pressure while the first task screen is displayed on the display, displaying, via the hardware processor of the mobile terminal, a home screen on the display; and
in response to the touch input applied to the back key on the mobile terminal that exceeds the reference pressure while the first task screen is displayed on the display, jumping, via the hardware processor of the mobile terminal, back to a previously displayed fourth task screen corresponding to a second application which has been used before the first application.

* * * * *